United States Patent
Foster et al.

(10) Patent No.: US 10,344,478 B2
(45) Date of Patent: Jul. 9, 2019

(54) COATING AND BINDER COMPOSITIONS FOR GYPSUM BOARDS

(71) Applicants: Valspar Sourcing, Inc., Minneapolis, MN (US); Georgia-Pacific Gypsum LLC, Atlanta, GA (US)

(72) Inventors: Michael D. Foster, Jamestown, NC (US); Nellie Moretz, Archdale, NC (US); James E. Bailey, Trinity, NC (US); John E. Kirkwood, Winston-Salem, NC (US); Brian W. Bland, Matthews, NC (US); Ali Fadhel, Atlanta, GA (US)

(73) Assignees: Axalta Coating Systems IP Co., LLC, Wilmington, DE (US); Georgia-Pacific Gypsum, LLC, Atlanta, GA (US)

( * ) Notice: Subject to any disclaimer, the term of this patent is extended or adjusted under 35 U.S.C. 154(b) by 0 days.

(21) Appl. No.: 14/469,435

(22) Filed: Aug. 26, 2014

(65) Prior Publication Data

US 2015/0064488 A1 Mar. 5, 2015

Related U.S. Application Data

(60) Provisional application No. 61/870,602, filed on Aug. 27, 2013, provisional application No. 61/870,341, filed on Aug. 27, 2013.

(51) Int. Cl.
*E04C 2/26* (2006.01)
*E04C 2/04* (2006.01)
(Continued)

(52) U.S. Cl.
CPC ............... *E04C 2/26* (2013.01); *B28B 11/04* (2013.01); *B28B 19/0092* (2013.01);
(Continued)

(58) Field of Classification Search
None
See application file for complete search history.

(56) References Cited

U.S. PATENT DOCUMENTS 3,984,596 A 10/1976 Failmezger
4,065,587 A 12/1977 Ting
(Continued)

FOREIGN PATENT DOCUMENTS

EP 1980540 A1 10/2008
WO 02058902 A2 8/2002
(Continued)

OTHER PUBLICATIONS

International Search Report and Written Opinion of counterpart international application No. PCT/US2014/052762, dated Dec. 3, 2014, 11 pp.
(Continued)

*Primary Examiner* — Chinessa T. Golden
(74) *Attorney, Agent, or Firm* — Lorenz & Kopf, LLP

(57) ABSTRACT

An adhesive binder composition for adhering a paper sheet to a gypsum article with a gypsum layer having at least one paper sheet on a major surface thereof. The adhesive binder composition includes a polymeric adhesive and at least one surfactant. The adhesive binder composition resides at a boundary between the gypsum layer and the paper sheet.

15 Claims, 8 Drawing Sheets

(51) Int. Cl.
| | |
|---|---|
| *B32B 9/04* | (2006.01) |
| *B32B 27/10* | (2006.01) |
| *B32B 27/30* | (2006.01) |
| *B32B 29/00* | (2006.01) |
| *B32B 37/12* | (2006.01) |
| *B32B 37/24* | (2006.01) |
| *C09J 133/08* | (2006.01) |
| *C04B 28/14* | (2006.01) |
| *B32B 37/15* | (2006.01) |
| *B28B 11/04* | (2006.01) |
| *B28B 19/00* | (2006.01) |
| *B28B 23/00* | (2006.01) |
| *B32B 5/26* | (2006.01) |
| *B32B 13/14* | (2006.01) |
| *B32B 38/00* | (2006.01) |
| *C04B 111/00* | (2006.01) |

(52) U.S. Cl.
CPC ............ *B28B 23/0006* (2013.01); *B32B 5/26* (2013.01); *B32B 9/045* (2013.01); *B32B 13/14* (2013.01); *B32B 27/10* (2013.01); *B32B 27/308* (2013.01); *B32B 29/002* (2013.01); *B32B 29/005* (2013.01); *B32B 37/12* (2013.01); *B32B 37/15* (2013.01); *B32B 37/24* (2013.01); *C04B 28/14* (2013.01); *C09J 133/08* (2013.01); *E04C 2/043* (2013.01); *B32B 38/164* (2013.01); *B32B 2037/243* (2013.01); *B32B 2250/04* (2013.01); *B32B 2250/20* (2013.01); *B32B 2255/02* (2013.01); *B32B 2255/12* (2013.01); *B32B 2262/101* (2013.01); *B32B 2305/20* (2013.01); *B32B 2307/54* (2013.01); *B32B 2307/546* (2013.01); *B32B 2315/18* (2013.01); *B32B 2317/125* (2013.01); *B32B 2398/10* (2013.01); *B32B 2607/00* (2013.01); *B32B 2607/02* (2013.01); *C04B 2111/00629* (2013.01); *Y10T 428/24992* (2015.01); *Y10T 428/273* (2015.01); *Y10T 428/2848* (2015.01); *Y10T 428/31906* (2015.04); *Y10T 428/31996* (2015.04); *Y10T 442/665* (2015.04)

(56) References Cited

U.S. PATENT DOCUMENTS

| | | | |
|---|---|---|---|
| 4,119,752 A | 10/1978 | Long | |
| 4,161,478 A | 7/1979 | Crivello | |
| 4,173,476 A | 11/1979 | Smith et al. | |
| 4,195,109 A | 3/1980 | Long | |
| 4,350,736 A | 9/1982 | Reily | |
| 4,555,545 A | 11/1985 | Kimura et al. | |
| 4,600,649 A | 7/1986 | Leo | |
| 4,859,723 A | 8/1989 | Kyminas et al. | |
| 4,900,763 A | 2/1990 | Kraushaar | |
| 4,902,975 A | 2/1990 | Kess | |
| 5,126,394 A | 6/1992 | Revis et al. | |
| 5,270,380 A * | 12/1993 | Adamson | C08G 18/62 524/556 |
| 6,194,064 B1 | 2/2001 | Keely et al. | |
| 6,436,159 B1 | 8/2002 | Safta et al. | |
| 6,641,629 B2 | 11/2003 | Safta et al. | |
| 6,663,979 B2 | 12/2003 | Deodhar et al. | |
| 6,844,374 B2 | 1/2005 | Jin et al. | |
| 6,852,768 B2 | 2/2005 | Jin et al. | |
| 6,887,937 B1 | 5/2005 | Vandevoorde et al. | |
| 6,931,809 B1 * | 8/2005 | Brown | E04B 1/762 156/90 |
| 6,956,079 B2 | 10/2005 | Scarlette | |
| 7,998,530 B2 | 8/2011 | Batdorf | |
| 8,404,365 B2 | 3/2013 | Burdick | |
| 2001/0001218 A1 | 5/2001 | Luongo | |
| 2003/0113572 A1 | 6/2003 | Deodhar et al. | |
| 2004/0154264 A1 | 8/2004 | Colbert | |
| 2004/0170873 A1 * | 9/2004 | Smith | B32B 13/14 428/703 |
| 2004/0209074 A1 | 10/2004 | Randall et al. | |
| 2005/0287293 A1 | 12/2005 | Rothman | |
| 2006/0029825 A1 | 2/2006 | Chen et al. | |
| 2006/0155031 A1 | 7/2006 | Wiercinski | |
| 2007/0246178 A1 | 10/2007 | Burdick | |
| 2008/0245012 A1 | 10/2008 | Boisvert et al. | |
| 2009/0110946 A1 * | 4/2009 | Martin | C04B 24/34 428/537.7 |
| 2009/0275250 A1 | 11/2009 | Smith et al. | |
| 2009/0297865 A1 | 12/2009 | Hauber et al. | |
| 2010/0047461 A1 | 2/2010 | Colbert | |
| 2010/0062264 A1 | 3/2010 | Hayes et al. | |
| 2010/0186870 A1 | 7/2010 | Stuart et al. | |
| 2012/0214887 A1 | 8/2012 | Stav et al. | |
| 2012/0231170 A1 | 9/2012 | Cao et al. | |
| 2013/0074737 A1 * | 3/2013 | Samanta | C04B 28/14 106/680 |

FOREIGN PATENT DOCUMENTS

| | | |
|---|---|---|
| WO | 02058902 A3 | 8/2002 |
| WO | 02102587 A1 | 12/2002 |
| WO | 2004067271 A2 | 8/2004 |
| WO | 2006004615 A1 | 1/2006 |

OTHER PUBLICATIONS

International Preliminary Report on Patentability from International Application No. PCT/US2014/052762, dated Mar. 10, 2016, 8 pp.
Communication pursuant to Rules 70(2) and 70a(2) and Supplementary Search Report dated Mar. 31, 2017, from counterpart European Application No. 14839855.5-1377/3039092, 3 pp.

\* cited by examiner

COATING AND BINDER COMPOSITIONS FOR GYPSUM BOARDS

RELATED APPLICATIONS

This application claims the benefit of U.S. Provisional Application No. 61/870,602, filed Aug. 27, 2013, which is incorporated by reference herein in its entirety. This application also claims the benefit of U.S. Ser. No. 61/870,341, entitled Membrane-ready Fibrous Faced Gypsum Panels, Apparatus, and Methods, filed Aug. 27, 2013 which is incorporated by reference herein in its entirety.

BACKGROUND

Gypsum boards include a gypsum core between opposed sheets of heavy paper or fiberglass mats. Gypsum boards with fiberglass mat facings are widely used for exterior sheathing applications in construction areas and have shown higher resistance to environmental degradation than conventional gypsum boards with paper facings. However, the fiberglass mats also have a rough and irregular surface, which is difficult to finish smoothly and consistently. Gypsum boards with fiberglass mats are also more difficult to cut and shape than gypsum boards with paper facings, and construction workers typically are advised to wear goggles, gloves and a dust mask to minimize exposure to the fine glass fibers liberated when cutting the fiberglass mats. Currently available gypsum boards with paper facings do not exhibit the exterior durability of the gypsum boards with fiberglass facings because the paper facing is generally more sensitive to environmental degradation than the fiberglass mat.

SUMMARY

In one embodiment, the present disclosure is directed to an adhesive binder composition for adhering a paper sheet to a gypsum article including a gypsum layer having at least one paper sheet on a major surface thereof. The adhesive binder composition includes a polymeric adhesive and at least one surfactant, and wherein the adhesive binder composition resides at a boundary between the gypsum layer and the paper sheet.

In another embodiment, the present disclosure is directed to an adhesive binder composition for adhering a paper sheet to a wallboard article, wherein the wallboard article includes a gypsum layer with a paper sheet on each major surface thereof. The adhesive binder composition includes a polymeric adhesive including an aqueous emulsion selected from acrylics, styrene acrylics, vinyl acrylics, styrene acetate acrylics, and combinations thereof, and at least one surfactant, and wherein the adhesive binder composition is present in high density slate regions of the gypsum layer adjacent to each of the paper sheets.

In another embodiment, the present disclosure is directed to a method of applying one or more adhesive compositions to a wallboard article, including depositing on a major surface of a first paper sheet a first slurry including gypsum, water, and an adhesive binder composition including a polymeric adhesive and at least one surfactant.

In another embodiment, the present disclosure is directed to a method of applying one or more adhesive compositions to a gypsum wallboard. The method includes the steps of:

(a) adding a first adhesive binder composition including a polymeric adhesive comprising an aqueous emulsion selected from acrylics, styrene acrylics, vinyl acrylics, styrene acetate acrylics, and combinations thereof, and at least one surfactant, to gypsum particles and water to form a first slate composition;

(b) applying the first slate composition on a major surface of a first paper sheet;

(c) adding a second adhesive binder composition including a polymeric adhesive including an aqueous emulsion selected from acrylics, styrene acrylics, vinyl acrylics, styrene acetate acrylics, and combinations thereof, and at least one surfactant, to gypsum particles and water to form a second slate composition, wherein the first and second slate compositions can be the same or different;

(d) applying the second slate composition on a major surface of a second paper sheet; and (e) applying between the first slate composition and the second slate composition a core composition including gypsum particles and water.

In yet another embodiment, the present disclosure is directed to a coating composition for an unattached wallboard article including a paper sheet on a gypsum layer. The coating composition includes an aqueous emulsion selected from acrylics, styrene acrylics, vinyl acrylics, styrene acetate acrylics, and combinations thereof, and at least one surfactant, and wherein the coating composition is applied on an exposed major surface of the paper sheet.

In yet another embodiment, the present disclosure is directed to a method of making an unattached wallboard article including a first paper sheet on a first major surface of a gypsum layer and a second paper sheet on a second major surface of the gypsum layer. The method includes (a) applying to an exposed surface of at least one of the first and the second paper sheets a coating composition including an aqueous emulsion selected from acrylics, styrene acrylics, vinyl acrylics, styrene acetate acrylics, and combinations thereof, and at least one surfactant; and (b) drying the coating composition.

In yet another embodiment, the present disclosure is directed to a method of making a wallboard including a first paper sheet, a second paper sheet, and a gypsum layer between the first paper sheet and the second paper sheet. The method includes (a) applying to an exposed surface of at least one of the first and the second paper sheets a coating composition including an aqueous emulsion selected from acrylics, styrene acrylics, vinyl acrylics, styrene acetate acrylics, and combinations thereof, and at least one surfactant; and (b) drying the gypsum layer and the coating composition to form a wallboard.

In yet another embodiment, the present disclosure is directed to a method of making a wallboard, including:

(a) coating a first gypsum layer on a first major surface of a first paper sheet, wherein a second major surface of the first paper sheet includes a first coating derived from an aqueous emulsion selected from acrylics, styrene acrylics, vinyl acrylics, styrene acetate acrylics, and combinations thereof, and at least one surfactant;

(b) coating a second gypsum layer on a first major surface of a second paper sheet, wherein a second major surface of the second paper sheet includes a second coating derived from an aqueous emulsion selected from acrylics, styrene acrylics, vinyl acrylics, styrene acetate acrylics, and combinations thereof, and at least one surfactant, and wherein the first coating and the second coating may be the same or different;

(c) depositing a third gypsum layer between the first gypsum layer and the second gypsum layer to form a wallboard precursor construction; and (d) drying the wallboard precursor construction to form a wallboard.

In yet another embodiment, the present disclosure is directed to a method of making a wallboard, including:

(a) applying a first coating composition to a first side of a first paper sheet, wherein the first coating composition includes an aqueous emulsion selected from acrylics, styrene acrylics, vinyl acrylics, styrene acetate acrylics, and combinations thereof, and at least one surfactant;

(b) depositing a first slurry on a second side of the first paper sheet to form a first gypsum slate layer, wherein the first slurry includes a first adhesive binder composition including an aqueous emulsion selected from acrylics, styrene acrylics, vinyl acrylics, styrene acetate acrylics, and combinations thereof, and at least one surfactant;

(c) applying a second coating composition to a first side of a second paper sheet, wherein the second coating composition includes an aqueous emulsion selected from acrylics, styrene acrylics, vinyl acrylics, styrene acetate acrylics, and combinations thereof, and at least one surfactant;

(d) depositing a second slurry on a second side of the second paper sheet to form a second gypsum slate layer, wherein the second slurry includes gypsum, water and a second adhesive binder composition including an aqueous emulsion selected from acrylics, styrene acrylics, vinyl acrylics, styrene acetate acrylics, and combinations thereof, and at least one surfactant;

(e) depositing a gypsum core layer between the first gypsum slate layer and the second gypsum slate layer to form a wallboard precursor construction, wherein the gypsum core layer includes gypsum, water, and entrained air; and (f) drying the wallboard precursor construction.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the figures indicated like elements.

DETAILED DESCRIPTION

The present disclosure is directed to compositions that can be applied to gypsum boards with paper facings, and the paper-faced gypsum board products that include such compositions. The compositions described herein can mitigate the damage caused when the paper-faced gypsum boards are exposed to interior or exterior environmental elements such as, for example, UV radiation, moisture, humidity, biological growth, and freeze-thaw cycles. Paper-faced gypsum boards including the compositions described herein can provide environmental resistance equal to or better than fiberglass-faced gypsum boards, and the paper facing is much easier to cut, shape and finish for an exterior or interior construction application.

In one embodiment, the present disclosure is directed to an adhesive binder composition that improves the bond of the paper facing to the gypsum-containing core. The adhesive binder composition (i) can be added to the gypsum core during the wallboard manufacturing process, or (ii) may be applied at an interface between the gypsum core and the paper facing during the wallboard manufacturing process, or (iii) may be coated on the paper facing to form an adhesive layer, and this adhesive layer is adjacent to the gypsum core in the wallboard construction. The embodiments (i), (ii), and (iii) can be practiced individually or in combination.

In another embodiment, a barrier coating composition may be applied on an exposed surface of the paper facings during the wallboard manufacturing process to enhance the environmental resistance of the wallboard construction, or may be applied as a topcoat layer to the exposed paper faces after the wallboard manufacturing process is complete.

The adhesive binder compositions and the barrier coating compositions described herein can be combined in a single gypsum board product, or any combination thereof could be utilized to obtain a desired set of properties for a particular end use application.

In this application the term "gypsum board" or "gypsum wallboard" refers to any product including gypsum, including, but not limited to, gypsum wallboard, dry wall, gypsum board, gypsum lath, and gypsum sheathing.

The gypsum board panels described in this disclosure are made of paper facings wrapped about a core including finely ground particles of raw gypsum ($CaSO_4.2H_2O$), which can also be referred to herein as gypsum stucco. In some embodiments, the adhesive binder composition described in this disclosure can be incorporated into the gypsum stucco as described below. In other embodiments, the gypsum stucco may be un-modified (free of the adhesive binder composition), and the adhesive binder composition may be resident at an interface between the un-modified stucco layer and the paper facing. In some embodiments, the adhesive binder composition may be a layer applied on the stucco, and in other embodiments may be formed as an adhesive layer on the paper facing adjacent to the stucco.

Figure 1:
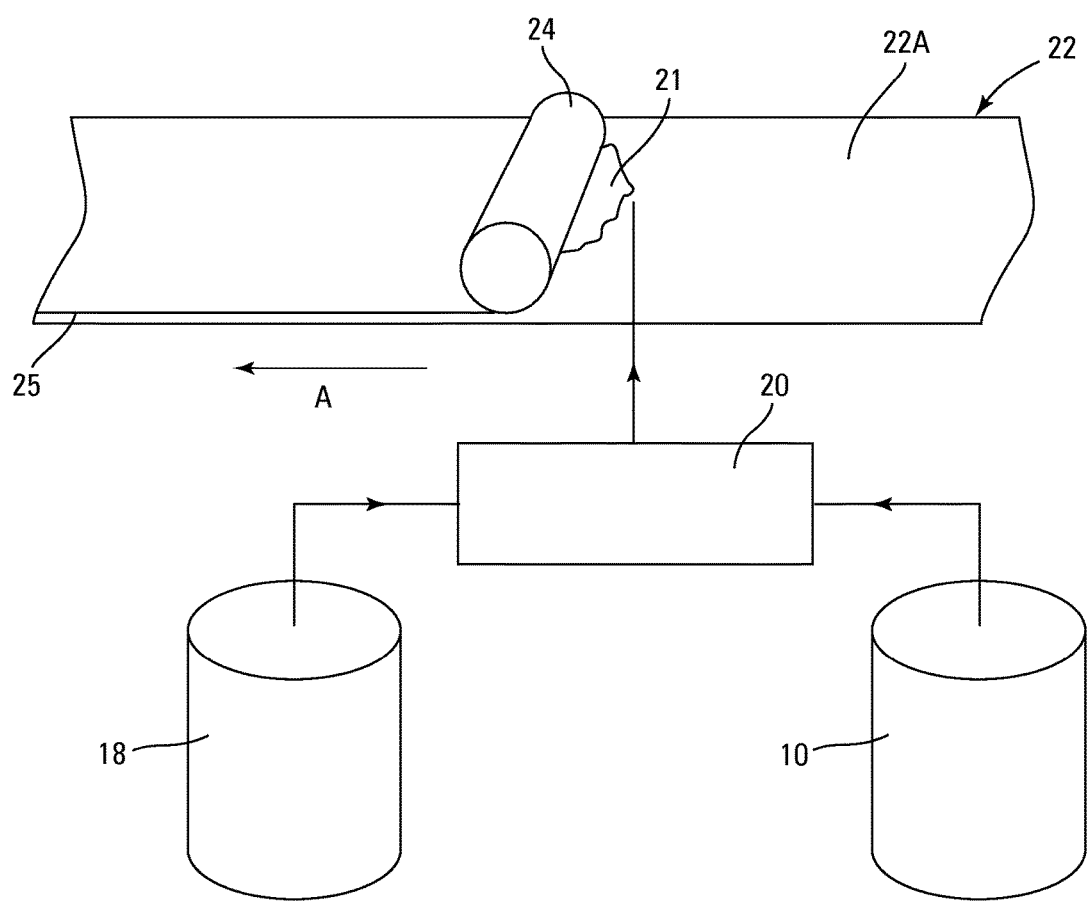
FIG. 1 is a schematic diagram of an embodiment of a process suitable for forming the gypsum boards described in the present disclosure.

In one non-limiting exemplary embodiment of a manufacturing process shown schematically in FIG. 1, a polymeric adhesive binder composition in a first vessel 10 and a gypsum mixture including gypsum particles, water and optional additives in a second vessel 18 are mixed in a static mixer 20 to form a slurry. In some embodiments, if the polymeric adhesive binder composition is incorporated into the gypsum slurry, the starch binder used in conventional gypsum board slurries to adhere the paper facings to the gypsum core may not be required, although starch can optionally be included in the slurry. The reduction and/or complete elimination of starch in the slurry can reduce the potential for mold and mildew growth in the final gypsum board product. The more hydrophobic nature of the adhesive in the adhesive binder composition, relative to starch, also reduces water wicking under the paper facing sheets. Compared to gypsum boards with conventional starch binders, the adhesive binder compositions described herein also can enhance the humid bond strength of the paper sheets to the gypsum core and can increase the strength of the gypsum core as evidenced by increased nail pull values—the resistance encountered when a nail is pulled through the gypsum core.

The polymeric adhesive binder composition may include a wide variety of polymeric adhesives for incorporation into the slurry, and any polymeric adhesive can be used that: (1) enhances the adhesion of the paper facing to the gypsum core; and (2) does not excessively inhibit the exothermic gypsum crystallization process that occurs during the drying of the gypsum core during board manufacture.

A variety of polymers may be employed in the adhesive binder composition, including latex polymers, water-dispersible polymers, water-reducible polymers, and oil-modified polymers.

Suitable latex polymers include (meth)acrylics, vinyls, polyesters, polyurethanes, polyamides, chlorinated polyolefins, ethylene vinyl acetate, polybutadiene, polyvinylidene, styrene acrylics, vinyl acrylics, vinyl versatic acid esters, styrene/butadiene, epoxy esters, polyureas, polysiloxanes, silicones, fluorinated copolymers, and mixtures or copolymers thereof. Such latex polymers normally contain at least polymeric particles, water, and one or more emulsifiers. The waterborne latex polymer particles may include one or more functional groups capable of reacting with an external crosslinker, and such external crosslinker may also be a part of the disclosed compositions.

Suitable latex polymers are typically stabilized using one or more nonionic or anionic emulsifiers (viz., surfactants), used either alone or together. If desired, the latex polymers may be stabilized with an alkali-soluble polymer. A water-soluble free radical initiator is typically used in the polymerization of a latex polymer. The latex polymer may optionally also be functionalized with olefinic groups or other crosslinkable groups where it is desired to enable the latex polymer to participate in radiation curing.

Exemplary commercially available latex polymers include ALBERDINGK AC 2514, ALBERDINGK AC 25142, ALBERDINGK AC 2518, ALBERDINGK AC 2523, ALBERDINGK AC 2524, ALBERDINGK AC 2537, ALBERDINGK AC 25381, ALBERDINGK AC 2544, ALBERDINGK AC 2546, ALBERDINGK MAC 24, and ALBERDINGK MAC 34 polymer dispersions from Alberdingk Boley, Inc.; AQUAMAC 720 from Hexion Specialty Chemicals; EPS 2538 acrylic latex, EPS 2540 styrene acrylic latex and EPS 2725 acrylic latex emulsions from EPS Corp.; RESYN™ 7305 vinyl acrylic emulsion from Celanese Emulsion Polymers; RHOPLEX™ 3131-LO, RHOPLEX E-693, RHOPLEX E-940, RHOPLEX E-1011, RHOPLEX E-2780, RHOPLEX HG-95P, RHOPLEX HG-700, RHOPLEX HG-706, RHOPLEX PR-33, RHOPLEX TR-934HS, RHOPLEX TR-3349 and RHOPLEX VSR-1050 acrylic emulsions from Rohm and Haas Co.; RHO SHIELD™ 636 and RHOSHIELD 3188 polymer dispersions from Rohm and Haas Co.; JONCRYL™ 538, JONCRYL 1552, JONCRYL 1972, JONCRYL 1980, JONCRYL 1982, JONCRYL 1984 and JONCRYL 8383 acrylic emulsions from BASF Resins; NEOCRYL™ A-1127, NEOCRYL A-6115, NEOCRYL XK-12, NEOCRYL XK-90, NEOCRYL XK-98 and NEOCRYL XK-220 acrylic latex polymers from DSM NeoResins, Inc., and mixtures thereof.

The disclosed compositions may alternatively or optionally contain a water-dispersible or water-reducible polymer. Exemplary water-dispersible polymers include polyurethanes, polyamides, chlorinated polyolefins, (meth)acrylics, vinyls, polyesters, and mixtures or copolymers thereof. The water-dispersible polymer typically will include as a part of the polymer a group or groups which render the polymer dispersible by itself in water. The water-dispersible polymer may optionally also be functionalized with olefinic groups or other crosslinkable groups where it is desired to enable the water-dispersible polymer to participate in radiation curing.

Exemplary commercially available water-dispersible or water-reducible polymers include acrylic copolymers available from BASF Corporation under the trade designation JONCRYL; PARALOID™ WR-97 water-reducible acrylic resin from Dow Coating Materials; AROLON™ 562-G2-70 water-reducible acrylic resin from Reichhold Inc.; MAINCOTE™ HG-54D and RHOPLEX™ WL-96 waterborne acrylic resins from Dow; AQUAMAC™ thermoplastic styrene acrylic latex resin from Momentive Specialty Chemicals Inc.; CARBOSET™ CR-760 and CARBOSET CR-765 thermoplastic styrene-acrylic copolymer emulsions from Lubrizol Advanced Materials, Inc.; TEXICRYL™ acrylic and styrene acrylate dispersions from Scott Bader Inc.; TEXIGEL™ dispersions from Scott Bader Inc.; EPS 6208 water-reducible alkyd resin from Engineer Polymer Solutions, Inc. ("EPS"); ANCAREZ™ AR555 water-reducible epoxy resin from Air Products and Chemicals, Inc.; BECKOPDX™ EP386W/56WA water-reducible epoxy resin from Cytec Industries; EPS 3216 water-reducible polyester resin from EPS; EPS 4213 polyurethane dispersion from EPS; BAYHYDROL™ PR 240 polyurethane dispersion from Bayer MaterialScience; and POLIDENE™ vinylidene chloride copolymer emulsions from Scott Bader Inc.

Oil-modified polymers may also be used as latex polymers or if appropriately stabilized as water-dispersible polymers. As used herein, oil-modified polymers include polymers that contain oils or oil based derivatives such as glyceride oils (monoglycerides, diglycerides, and the like), fatty acids, fatty amines, and mixtures thereof. Examples of such oil-modified polymers include alkyds, oil-modified polyurethanes, oil-modified polyamides, oil-modified acrylics, and mixtures or copolymers thereof.

In various embodiments, the adhesive binder compositions contain about 90 to about 30% by weight latex or water-dispersible polymer based on the total weight of the non-volatile components in the coating system, about 80 to about 35% by weight, or about 70 to about 40% by weight. If a water-dispersible polymer is also employed, it may be present in an amount less than the amount of latex polymer.

In some embodiments, aqueous emulsions such as acrylics, styrene acrylics, and vinyl acrylics have been found to work well in the adhesive binder composition. In some embodiments, the polymers and copolymers in these emulsions have a glass transition temperature (Tg) of about −45° C. to about 115° C., and in other embodiments the polymers and copolymers can have glass transition temperatures (Tg) of about 0° C. to about 30° C. In some embodiments, (meth)acryl monomers can be copolymerized with styrene or vinyl monomers, and may be incorporated into the gypsum slurry in water-borne or 100% solids form. In some embodiments, the resins range in pH from about 1.5 to about 11, or from about 1.7 to about 10, have particle sizes that range from about 30 to about 400 nanometers, and non-volatile matter ("NVM") ranges from about 21% to about 65%.

Examples include, but are not limited to, acrylic aqueous emulsions available from EPS, under the trade designations EPS 2103, EPS 2111, EPS 2113, EPS 2117, EPS 2257, EPS 2293, EPS 2705, EPS 2708, EPS 2757 and EPS 2772, as well as styrene acrylic aqueous emulsions EPS 2272, EPS 2507, EPS 2510, EPS 2512, EPS 2514, EPS 2526, EPS 2533, EPS 2535, EPS 2537, EPS 2548, EPS 2550, EPS 2561, EPS 2568, EPS 2572, and EPS 2851. Other examples include vinyl acetate acrylic copolymer emulsions available from Dow Chemical Co., Midland. Mich., under the trade designation Rovace, particularly Rovace 9100.

In various embodiments the gypsum slurry includes about 4 wt % to about 40 wt % of the adhesive binder composition, about 7 wt % to about 16 wt %, about 8 wt % to about 11 wt %, or about 9 wt % to about 11 wt %, based on dry solids.

The adhesive binder composition further preferably includes at least one surfactant. Many different types of surfactants can be used, and suitable surfactants should preferably increase wetting of the paper facing sheets during the open time when the wet gypsum layer and the paper sheets are in contact with one another during the manufacturing process. In one embodiment, the paper first comes into contact with the gypsum slurry after the slurry has started an exothermic crystallization process, and the open time continues as the gypsum board is dried and water is gradually removed from the gypsum core. In some embodiments, a single surfactant in the adhesive binder composition can be sufficient to efficiently wet the paper facing sheets and transport the adhesive to the interface with the paper facing sheets, and in other embodiments a mixture or two more surfactants has been found to be useful.

While not wishing to be bound by any theory, presently available evidence indicates that a surfactant's ability to wet the paper facing sheets gives a general indication of a surfactant's ability to assist in transport and migration of the adhesive molecules in the adhesive binder composition to an interface with the paper facing during the gypsum core drying process. Again, while not wishing to be bound by any theory, this transport appears to increase the strength of the paper gypsum board construction by allowing increased entanglement of the adhesive molecules and the fibers on the adjacent surfaces of the paper sheets. The migration of the adhesive into the paper itself can be impeded or enhanced by the construction of the internal plies of the paper and the chosen location of sizing with additional sizing impeding movement of the adhesive deeper into the paper.

To provide good bond strength at the interface with the paper facing sheets, the selected surfactant for the adhesive binder composition should preferably wet the paper sheets quickly, have a low foam height, and have low surface tension. In some embodiments, suitable surfactants are nonionic surfactant compounds with an HLB value of about 1 to about 20. In other embodiments nonionic surfactants with lower HLB values of about 1 to about 10 provide good bond strength at the paper facing interface. It is generally understood that a low foam surfactant will have an HLB less than 4. In applications where low foam is required, an antifoaming agent may be used. However, this may not be sufficient to provide long term storage of the surfactant without phase separation. By utilizing surfactants with a HLB in the range of 1 to 10, with a preference of lower than 4, the surfactant may be stored for extended periods without phase separation.

In some embodiments the molecular weight (MW) of the surfactants in the adhesive binder composition can range from about 1000 to about 6000 Daltons, or about 1100 to about 5500 Daltons, or about 3000 to about 5000 Daltons.

The surfactant or mixture of surfactants utilized in the adhesive binder composition reduces the surface tension of the composition to about 30 to about 60 dynes/cm, in some embodiments about 33 dynes/cm to about 52 dynes/cm, and in other embodiments about 35 dynes/cm to about 40 dynes/cm.

Suitable nonionic surfactants for incorporation into the adhesive binder composition include, but are not limited to, compounds of block copolymers based on ethylene oxide and propylene oxide available under the trade designation Pluronic from BASF SE, such as Pluronic L31 (difunctional block copolymer terminating in primary hydroxyl groups), Pluronic 17R2 (difunctional block copolymer terminating in secondary hydroxyl groups), and Pluronic 25R2 (difunctional block copolymer terminating in secondary hydroxyl groups). These compounds have an HLB value of about 1 to about 7. Other suitable surfactants include nonionic octylphenol ethoxylates and nonionic nonylphenol ethoxylate available from Dow Chemical Co. under the trade designation Triton X-405 (HLB=17-18) and Tergitol NP-10 (HLB=13-14), as well as other nonionic surfactants like those available from Air Products and Chemicals, Allentown Pa., under the trade designation Dynol, particularly Dynol 607 (HLB=8).

For example, one surfactant combination that has shown good bond strength when utilized with the adhesives described above includes a Pluronic surfactant and a Triton surfactant, particularly Pluronic 25R2 and Triton X-405.

In some embodiments, the surfactant or mixture of surfactants in the adhesive binder composition should be present in the adhesive binder composition at about 0.01 to about 5 wt %, or about 0.25 to about 2 wt %, or about 0.25 to about 0.5 wt %, based on dry solids.

In some embodiments, the slurry may optionally include starch such as, for example, corn starch. The starch can be present in the slurry at up to about 2 wt %, based on the total weight of the slurry. However, starch can provide a food source for mold and mildew in the gypsum core, so complete elimination or significant reduction of the amount of starch in the slurry can enhance mold and mildew resistance in the final gypsum board product.

In various embodiments, the adhesive binder composition and/or the slurry may also include a wide range of additives including, but not limited to, water, glass, paper or wood fibers, mineral fillers, strength additives, accelerators, retarders, crystallized gypsum particles, dispersants, fire retardants, water absorbers, water repellants, mold inhibitors, UV light resistant compounds, pH adjusters, rheology modifiers, flow control agents, defoamers, and the like.

Thickeners may include hydroxyethyl cellulose; hydrophobically modified ethylene oxide urethane; processed attapulgite, a hydrated magnesium aluminosilicate; and other thickeners known to those of ordinary skill in the art. For example, thickeners may include CELLOSIZE QP-09-L and ACRYSOL RM-2020NPR, commercially available from Dow Chemical Company (Philadelphia, Pa.); and ATTAGEL 50, commercially available from BASF Corporation (Florham Park, N.J.).

Surfactants may include sodium polyacrylate dispersants, ethoxylated nonionic compounds, and other surfactants known to those of ordinary skill in the art. For example, surfactants may include HYDROPALAT 44, commercially available from BASF Corporation; and DYNOL 607, commercially available from Air Products (Allentown, Pa.).

Defoamers may include multi-hydrophobe blend defoamers and other defoamers known to those of ordinary skill in the art. For example, defoamers may include FOAMASTER SA-3, commercially available from BASF Corporation.

Fillers may include inorganic, mineral fillers, such as sodium-potassium alumina silicates, microcrystalline silica, talc (magnesium silicate), and other fillers known to those of ordinary skill in the art. For example, fillers may include MINEX 7, commercially available from the Cary Company (Addison, Ill.); IMSIL A-10, commercially available from the Cary Company; and TALCRON MP 44-26, commercially available from Specialty Minerals Inc. (Dillon, Mont.).

Biocides may include broad-spectrum microbicides that prohibit bacteria and fungi growth, antimicrobials such as those based on the active diiodomethyl-ptolylsulfone, and other compounds known to those of ordinary skill in the art. For example, biocides may include KATHON LX 1.5%, commercially available from Dow Chemical Company, POLYPHASE 663, commercially available from Troy Corporation (Newark, N.J.), and AMICAL Flowable, commercially available from Dow Chemical Company. Biocides may also act as preservatives.

UV absorbers may include encapsulated hydroxyphenyl-triazine compositions and other compounds known to those of ordinary skill in the art, for example, TINUVIN 477DW, commercially available from BASF Corporation.

Transfer agents such as polyvinyl alcohol (PVA) and other compounds known to those of ordinary skill in the art may also be included in the material coating composition.

These additives are optionally present in the slurry up to about 5 wt %, or at about 0.01 wt % to about 2 wt %, or about 0.1 wt % to about 1 wt %, based on the total weight of the slurry.

Referring again to FIG. 1, the slurry 21 including the adhesive binder composition is delivered by the mixer 20 and dispensed onto a major surface 22A of a sheet of paper 22 moving in the direction of arrow A. An arrangement of rollers 24 spreads the slurry evenly on the major surface 22A of the paper sheet 22 to form a gypsum layer 25 on the surface 22A.

The paper sheets utilized to make the gypsum boards described herein are designed for optimized penetration of the adhesive binder composition upon contact. Paper used in gypsum boards is specified to be in the range of 35 basis weight (35 pounds per thousand ft$^2$, about 1.5 kg/1000 m$^2$) to 65 basis weight (65 pounds per thousand ft$^2$, about 2.7 kg/1000 m$^2$).

In addition, while not wishing to be bound by any theory, presently available evidence suggests that inclusion of sizing compounds in the paper can impede penetration of the adhesive binder composition into the paper, so it is preferred that the paper include a minimum amount of sizing compounds to maintain its integrity and proper porosity for gypsum board manufacturing.

Figure 2A:
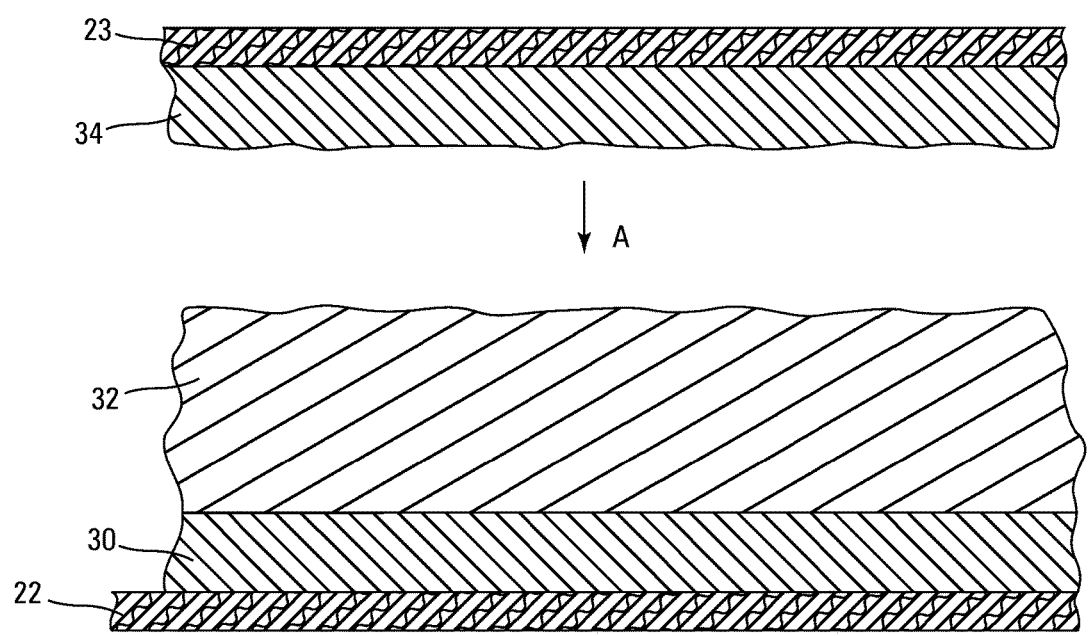
FIGS. 2A-2B are schematic, cross-sectional views of gypsum boards proceeding through the process of FIG. 1.

In an embodiment illustrated schematically in FIG. 2A, a first, dense layer of slurry 30 that is substantially free of added air, referred to herein as a first slate layer, is applied to the major surface of a paper sheet 22. A second sheet of paper 23 that includes a major surface having thereon a second dense slate layer 34, which is also substantially free of added air, and may be the same or different than the first slate layer 30, is then moved in the direction of the arrow A toward the first slate layer 30. A thicker second layer of slurry 32, referred to herein as the core layer, which is less dense than the slate layers 30, 34, and in some embodiments includes entrained air, is blown between the the first slate layer 30 and the second slate layer 34. The second slate layer 34 lies on a first major surface of the core layer 32, and the first slate layer 30 lies on a second opposed major surface of the core layer 32.

Figure 2B:
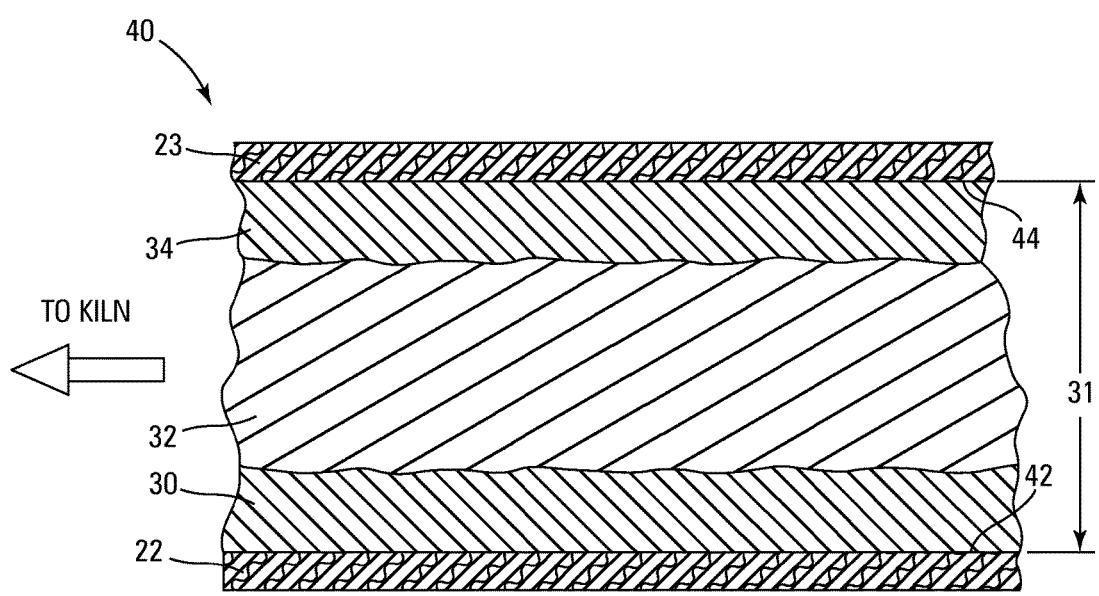

The resulting "sandwich-like" construction 40 is shown in FIG. 2B. In the construction 40, the relative thicknesses of the slate layers 30, 34 and the core layer 32 may vary widely. In some embodiments, the gypsum core 31 may include a single slate layer. In the embodiment shown in FIG. 2B, the slate layers 30, 34 may vary greatly in thickness, but in general the slate layer or layers makes up about 20% by weight of the gypsum core 31. In some embodiments each slate layer makes up about 3% to about 10 wt % of the gypsum core 31, or about 3 to about 7.5 wt % of the gypsum core 31, and the core layer 32 makes up the remainder of the gypsum core 31. The slurry compositions of the slate layers 30, 34 and the core layer 32 may be the same or different, depending on the intended application of the final gypsum board product.

The "sandwich-like" construction 40 passes through a system of rollers (not shown) to further compact the gypsum core layer 32 and slate layers 30, 34. The paper sheets 22, 23 are folded about the edges, and the resulting panels are exposed to carefully controlled levels of heat and humidity in a large drying oven referred to as a kiln.

During this drying step in the kiln, the gypsum in the core layer 32 and the slate layers 30, 34 crystallizes and an exothermic reaction occurs that produces the hemihydrate of calcium sulfate ($CaSO_4 \cdot 1/2H_2O$), while evolving water through the overlying porous paper sheets 22, 23. As the water migrates out of the gypsum core/slate layers and through the paper sheets 22, 23, the migrating water and surfactant(s) deliver the adhesive binder composition present in the core layer 32 and/or the slate layers 30, 34 to the interfaces 42, 44 with the overlying paper sheets 22, 23. The adhesive binder composition then enhances the adhesion of the paper sheet 22 to the slate layer 30, and the adhesion of the paper sheet 23 to the slate layer 34.

While not wishing to be bound by any theory, presently available evidence suggests that the adhesive binder composition present in the slurry modifies the exothermic reaction curve of any or all of the gypsum-containing layers 30, 32, 34. Adhesives or surfactant/adhesive combinations in the slurry that slow down the exothermic reaction time, while still allowing the gypsum-containing layers 30, 32, 34 to crystallize in a commercially useful amount of time, have shown excellent bond strength results at the interfaces with the paper sheets 22, 23. Again, while not wishing to be bound by any theory, an adhesive binder composition that extends the exothermic reaction time appears to provide more time for the adhesive in the binder composition to migrate from the gypsum-containing layers 30, 32, 34 to the interfaces 42, 44 with the respective paper sheets 22, 23. This extended "open time" provides more opportunities for the adhesives from the gypsum-containing layers 30, 34 and the paper fibers in the paper sheets 22, 23 to become bonded and entangled with one another, which enhances bond strength of the construction 40.

Following the completion of the drying process, the gypsum core 31 becomes sufficiently rigid and strong for use as a building material.

Figure 3:
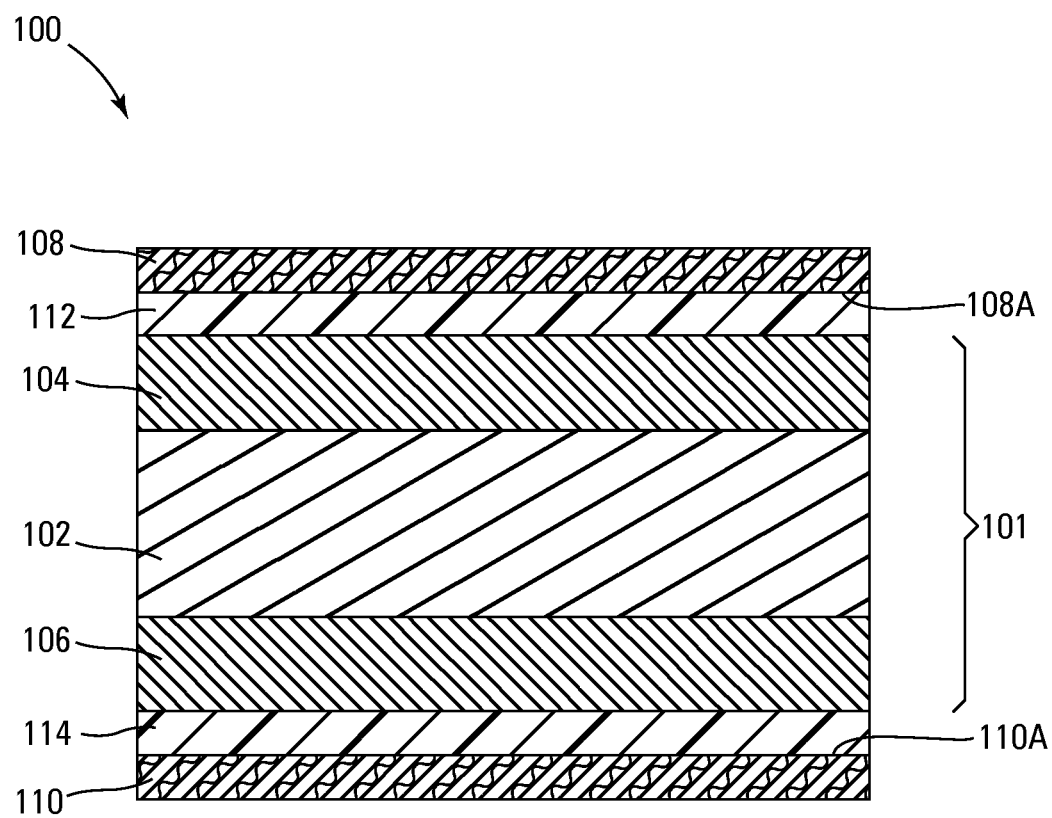
FIG. 3 is a schematic cross-sectional view of a gypsum board proceeding through the process of FIG. 1.

FIG. 3 shows a cross-sectional view of an embodiment of a wet paper-faced gypsum board precursor 100 proceeding through the drying/calcining process referred to above. The gypsum board precursor 100 includes a gypsum layer 101 with a dense core phase 102, which may optionally include the adhesive binder composition. The gypsum layer 101 further includes on the opposed sides of the core phase 102 high-density slate phases 104, 106. The slate phases 104, 106 include the adhesive binder compositions described above. The gypsum layer 101 has applied thereon a first paper sheet 108 on the slate phase 104, and a second paper sheet 110 on the slate phase 106.

The slate phases 104, 106, which may be the same or different, include about 4 to about 40 wt % of the adhesive binder composition (about 0.048 to about 0.240 g/m$^2$ binder), or about 7 to about 16 wt % (about 0.055 to about 0.117 g/m² binder), or about 8 to about 11 wt % (about 0.062 to about 0.083 g/m² binder), or about 9 to about 11 wt % (about 0.070 to about 0.083 g/m² binder), based on dry solids.

As the panel 100 is dried in the kiln and crystallization proceeds in the gypsum layer 101, the water, adhesive binder composition and additives in the gypsum layer 101 migrate into temporary coating layers 112, 114 adjacent to the interfaces 108A and 110A with the paper sheets 108, 110. During the drying process the adhesives, surfactants, gypsum particles, optional additives and water are present in the temporary coating layers 112, 114, for a period of time in a liquid phase at the interfaces 108A, 110A. In some embodiments, the adhesives and optional surfactants described herein increase the "open time," the time that all components are in the liquid phase in the temporary coating layers 112, 114 at the interfaces 108A, 110A. While not wishing to be bound by any theory, this extended open time increases the opportunity for mechanical entanglement and chemical bonding of the paper sheets 108, 110 to the gypsum layer 101, which increases interfacial bond strength at the paper interfaces 108A, 110A. This improved interfacial bond strength generally improves humid bond resistance and overall strength when the final product is utilized as a building material.

However, while increasing the open time can lead to better interfacial bond strength between the paper sheets 108, 110 and the gypsum layer 101, the open time should be carefully controlled to ensure that gypsum particle crystallization in the slate regions 112, 114 is not significantly impeded to extend beyond a commercially useful time of about 1 hour, in some embodiments less than about 40 minutes. Incomplete crystallization in the slate regions 112, 114 at the interfaces 108A, 110A can lead to poor strength in the final gypsum board product.

Figure 4:
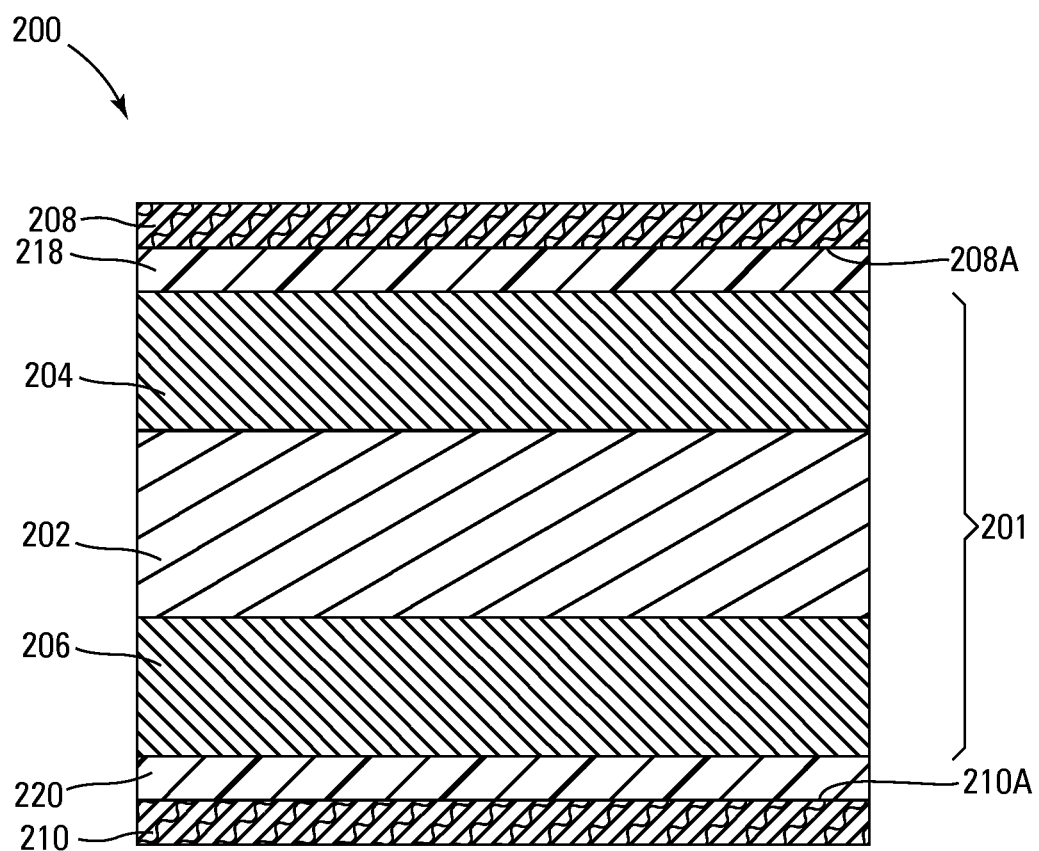
FIG. 4 is a schematic cross-sectional view of an embodiment of a gypsum board article.

Referring to FIG. 4, an embodiment of a gypsum board 200 following the drying process includes a gypsum layer 201 with a low-density core layer 202 that may optionally include the adhesive binder composition described above. The gypsum layer 201 further includes high-density slate layers 204, 206 on the opposed sides of the core phase 202. The slate layers 204, 206 include the adhesive binder composition. The gypsum layer 201 has thereon a first paper sheet 208 on the slate layer 204, and a second paper sheet 210 on the slate layer 206.

In the embodiment of FIG. 4, the gypsum board 200 further includes at least one layer of an optional interface adhesive 218, 220 between the slate layers 204, 206 and their respective adjacent paper sheets 208, 210. The dried film thickness of the interface adhesive layer 218, 220 is about 0.1 mils (0.0025 mm) to 3 mils (0.08 mm).

In some embodiments, the layers of the interface adhesive 218, 220 can further enhance the bond between the paper sheets 208, 201 and the slate layers 204, 206 at the interfaces 208A, 210A, which can increase structural strength of the gypsum board and prevent the paper from delaminating from the gypsum core 201 when exposed to moisture in exterior building applications.

In one embodiment, the adhesive binder composition that forms the interface adhesive layers 218, 220, can be applied to the paper sheets 208, 210 during the paper manufacturing process and dried before the paper is used in the gypsum board manufacturing process. In another embodiment, the adhesive binder composition that forms the interface adhesive layers 218, 220 can be applied wet directly onto the wet slate layers 204, 206 before the paper sheets 208, 210 are attached in the gypsum board manufacturing process. In yet another embodiment, the adhesive binder composition that forms the interface adhesive layers 218, 220, can be applied wet directly onto the major surfaces of the paper layers 208, 210 before the wet gypsum slate layers 204, 206 are applied. In another embodiment not shown in FIG. 4, the interface adhesive composition can optionally be applied on the core layer 202 at an interface with either or both of the slate layers 204, 206.

The adhesive binder composition that forms the interface adhesive layers 218, 220 can be applied in any commercially useful manner, including spraying, roll coating, curtain coating, and the like. The physical properties of the adhesive binder composition such as, for example, viscosity, % solids, and the like, can be adjusted as necessary for a selected application method.

The amount of the adhesive binder composition used to form the interface adhesive layers 218, 220 should be sufficient to provide good adhesion between the paper sheets 208, 210 and the respective adjacent slate layers 204, 206, but should be present in an amount that will have a minimum effect on the porosity of the paper sheets 208, 210 or the water transport out of the slate layers 204, 206 during the kiln drying process. The interface adhesives 218, 220 should be present in an amount such that passage of water through the paper sheets 208, 210 during the process of drying the gypsum core 201 is not unduly restricted. In some embodiments, the adhesive binder compositions can be applied in patterns such that some areas on the major surfaces 208A, 210A of the paper sheets 208, 210 remain uncoated, which in some cases can allow for greater passage of water through the paper sheets 208, 210 during the gypsum board manufacturing process.

The adhesive binder composition forming the interface adhesive layers 218, 220 can include the same latex polymers, water-dispersible polymers, water-reducible polymers, and oil-modified polymers described above for use in the adhesive binder composition for the gypsum layer 201.

In other embodiments, the interface adhesive binder composition described above may optionally be combined with a hydrophobic, high-tack pressure sensitive adhesive (PSA) with a low Tg of about 0° C. to about 30° C., or the PSA may be present on the facing papers 208, 210 as a separate adhesive layer. Examples include, but are not limited to, PSAs available from EPS such as EPS 2111, 2113, 2117, and resins such as emulsion 3 cited in the examples below. In some embodiments, the high tack provided by the PSA improves the immediate realized adhesion upon contact between the paper sheets 208, 210 and the gypsum layer 201.

Figure 5:
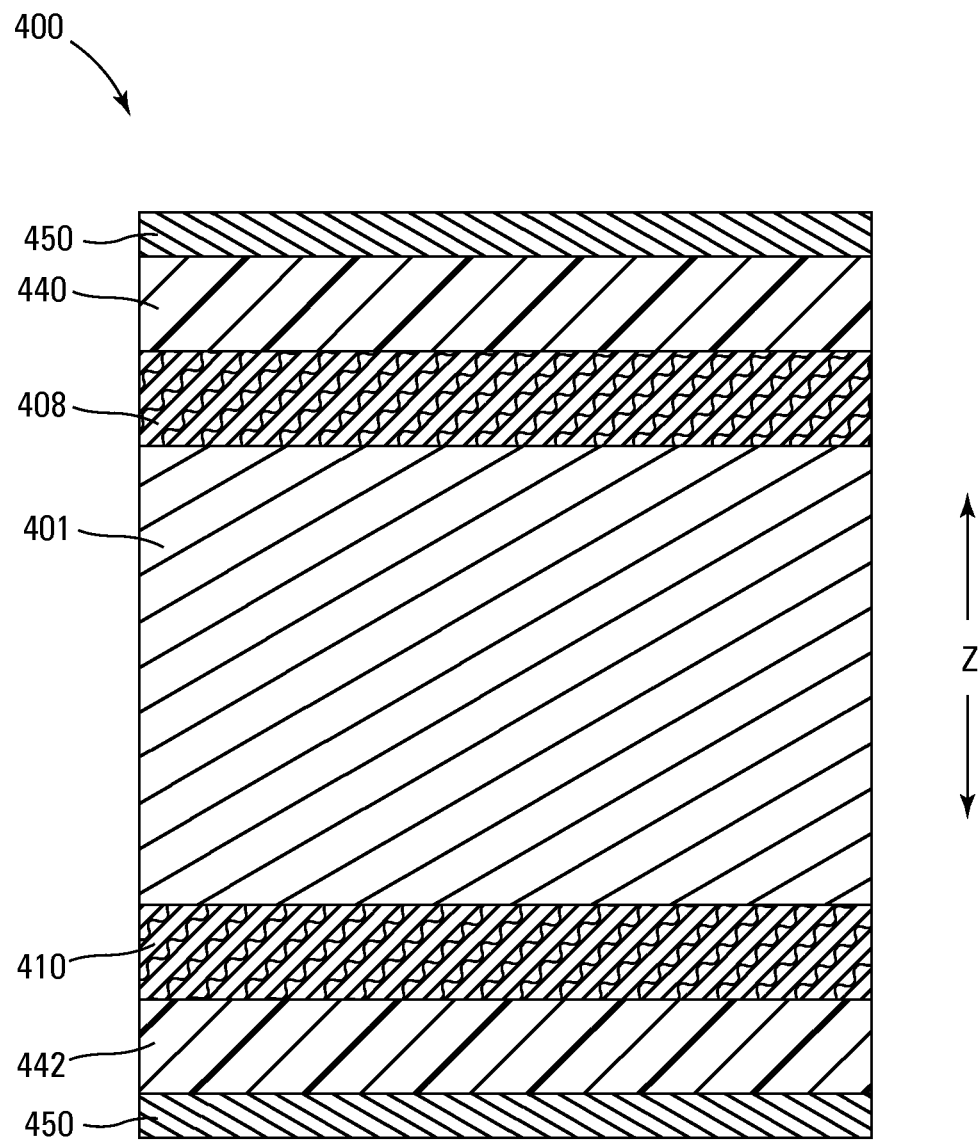
FIG. 5 is a schematic, cross-sectional view of another embodiment of a gypsum board article including barrier coatings.

Another embodiment of a gypsum wallboard 400 shown in FIG. 5 includes a gypsum core 401 and paper facing sheets 408, 410. The core 401 may further include all the sub-layers shown in, for example, FIG. 4, but for clarity these additional layers are not shown in FIG. 5. Any layer or layers in the core 401 may optionally include the adhesive binder compositions described above.

In some embodiments, the gypsum wallboard 400 further includes a backside coating 440 and a front sealer coating 442, or both. The front sealer coating 442 is intended for the side of the wallboard 400 directly exposed to the environment. A barrier coating composition forming the coatings 440, 442 can be applied to the exposed major surfaces of the paper sheets 408, 410 after the wallboard 400 is removed from the kiln to enhance resistance to environmental degradation from, for example, staining, moisture, air and/or UV radiation. In another embodiment, a barrier coating composition forming the sealer and backside coatings 440, 442 could also be applied to the exposed major surfaces of the paper sheets 408, 410 in the gypsum wallboard manufacturing process prior to or at the same time the gypsum slurry is applied to the opposed major surfaces of the paper to form the core 401. The barrier coating composition forming the coatings 440, 442 may be wet or dry at the time the gypsum slurry is applied. The barrier coating composition forming the backside and sealer coatings 440, 442 can be applied to the paper layers 408, 410 in any commercially useful manner, including, but not limited to, direct roll coating, airless spraying, curtain coating, and the like.

The barrier coating compositions forming the coatings 440, 442 can be the same or different, and can provide a number of advantages, including, but not limited to, a smoother exterior surface finish than comparable fiberglass mats, better protection and resistance to moisture erosion in the gypsum core 401, higher flexural strength for the paper sheets 408, 410, improved liquid water repellency while allowing moisture vapor migration through the paper sheets 408, 410, enhanced UV protection to prevent yellowing and maintain color fastness of the paper sheets 408, 410, and improved mold growth inhibition in the gypsum core 401 and the paper sheets 408, 410.

While not wishing to be bound by any theory, the barrier coating composition utilized to make the backside and sealer coatings 440, 442 should be formulated to maximize the z-directional (through the thickness) strength of the paper, control moisture intrusion as measured by a Cobb ring apparatus, and allow water vapor breathability of the final product controlled through moisture vapor transmission rate (MVTR). In some embodiments, this is accomplished by establishing the operational pigment volume concentration (PVC) range and utilizing surfactants and hydrophobic agents in the barrier coating compositions. In some embodiments, a suitable working range is about 0 to about 70 PVC, with a preferred range of about 40 to about 50 PVC.

While not wishing to be bound by any theory, maintaining a low Cobb value is a method of managing moisture intrusion. Suitable Cobb values are from about 0 to about 3.0 g/100 cm$^2$ over 2 hrs, and in other embodiments the Cobb value should be about 0 to about 1.5 g/100 cm$^2$ over 2 hrs. MVTR can have an impact on the breathability of the final gypsum board product. The acceptable MVTR value based on a dry cup method at 50% RH/70° F. is about 1 to about 30 grains/ft$^2$/hour, or about 8 to about 20 grains/ft$^2$/hour.

While there are multiple choices of pigment, resin, and surfactants to choose from in formulating the barrier coating composition for the sealer coatings 440 and 442, in one embodiment surfactants are utilized in the composition to achieve penetration into the paper to maximize z-direction strength. Many different types of surfactants can be used, and suitable surfactants should decrease the penetration time of the coating into the paper facing sheets 408, 410. While not wishing to be bound by any theory, enhanced wetting of the paper sheets 408, 410 gives a general indication of a surfactant's ability to assist in transport and migration of the barrier coating composition applied at some time after the kiln drying process to an interface with the paper sheets. Again, while not wishing to be bound by any theory, presently available data indicate that this transport increases the strength of the paper gypsum board construction by allowing increased entanglement of the coating molecules and the fibers on the surfaces of the paper sheets. Utilization of surfactants with the minimization of sizing additives in the paper provides a path for full penetration into the paper sheets, which provides increased z-directional strength.

In the embodiments described herein the machine direction is defined as the x axis, the cross-web direction is defined as the y axis, and the z axis correlated to the z directional strength runs through the thickness of the paper across the paper sheets 408, 410 in FIG. 5 starting at 401 and ending at the coatings 440, 442.

The applied film thickness, coating porosity through pigment to volume concentration, and pigment selection based on hydrophobicity, surface treatment and particle size should be adjusted to allow water vapor and air permeability and make the coatings 440, 442 breathable with a measured permeability greater than 1 grain/ft$^2$/hour, and in some embodiments with a range of about 8 to about 50 grains/ft$^2$/hour.

The barrier coating compositions giving rise to the coatings 440, 442 may include the same latex polymers, water-dispersible polymers, water-reducible polymers, and oil-modified polymers described above for use in the adhesive binder composition for the gypsum layer, as long as the composition, when dried to form the coatings 440, 442, is durable, preferably exterior durable when used in an exterior product, and provides a substantially tack-free, block-resistant finish. In this application, exterior durable means that the coatings 440, 442 resist degradation by the elements, including, for example, water and UV exposure, for a time sufficient to allow an exterior cladding to be applied, typically about 6 months to about 1 year. Block resistance refers to the ability of the coatings 440, 442 to avoid adhesion to other similarly coated articles when the articles are stacked on top of one another, face-to-back or face-to-face. The term substantially tack-free means that the coatings 440, 442 are not sticky to the touch or prone to excessive dirt pick-up.

In some embodiments, aqueous emulsions such as acrylics, styrene acrylics, and vinyl acrylics have been found to work well in the barrier coating compositions giving rise to the coatings 440, 442. In some embodiments, the polymers and copolymers in these emulsions have a glass transition temperature of about −45° C. to about 115° C., and in other embodiments the polymers and copolymers can have glass transition temperatures of about 0° C. to about 30° C. In some embodiments, (meth)acryl monomers can be copolymerized with styrene or vinyl monomers, and may be incorporated into the barrier coating compositions in water-borne or 100% solids form. In some embodiments, the resins range in pH from about 1.5 to about 11, or from about 1.78 to about 10.0, have particle sizes that range from about 30 to about 400 nanometers, and NVM ranges from about 21% to about 65%.

Examples include, but are not limited to, acrylic aqueous emulsions available from EPS, under the trade designations EPS 2103, EPS 2111, EPS 2113, EPS 2117, EPS 2257, EPS 2293, EPS 2705, EPS 2708, EPS 2757 and EPS 2772, as well as styrene acrylic aqueous emulsions EPS 2272, EPS 2507, EPS 2510, EPS 2512, EPS 2514, EPS 2526, EPS 2533, EPS 2535, EPS 2537, EPS 2548, EPS 2550, EPS 2561, EPS 2568, EPS 2572, and EPS 2851. Other examples include vinyl acetate acrylic copolymer emulsions available from Dow Chemical Co., Midland. Mich., under the trade designation Rovace, particularly Rovace 9100.

In other embodiments, a variety of 100% solids coating compositions have been found to be useful in the barrier coating compositions giving rise to the coatings 440, 442. Representative 100% solids coating compositions include free-radically curable coating compositions, cationically curable coating compositions, ionically curable and multi-part (e.g., two-part) coating compositions. The coating compositions contain one or more reactive monomers, oligomers or polymers, and may be free of or substantially free of volatile solvents or carriers that represent hazardous air pollutants. The compositions may also be free of water, and thus may be more rapidly cured. In various embodiments, these compositions may be cured using radiation (e.g., ultraviolet light (UV), visible light or electron beam energy), thermal energy or a combination thereof.

Representative free-radically curable coating compositions include at least one and preferably at least two sites of ethylenic unsaturation curable through a free radical-induced polymerization mechanism. Exemplary compositions include those described in U.S. Pat. Nos. 4,600,649, 4,902,975, 4,900,763, 4,065,587, 5,126,394, 6,436,159 B1, 6,641,629 B2, 6,844,374 B2, 6,852,768 B2 and 6,956,079 B2, the disclosures of which are incorporated herein by reference. Representative free-radically curable monomers, oligomers or polymers which may be used in the disclosed method include (meth)acrylates, urethanes, urethane(meth)acrylates, epoxy(meth)acrylates, polyether(meth)acrylates, polyesters, polyester(meth)acrylates, polyester urethanes, silicone (meth)acrylates, cellulosic acrylic butyrates, nitrocellulosic polymers, and blended or grafted combinations thereof. The monomer or monomers may for example represent about 10 to about 85%, about 15 to about 45%, or about 30 to about 45% by weight of the coating composition. The oligomer oligomers may, for example, represent about 10 to about 90% or about 30 to about 50% by weight of the coating composition. The chosen monomers may for example be selected to alter the spray characteristics of the curable composition, and may include monofunctional or polyfunctional (e.g., di- or trifunctional) monomers such as isobornyl acrylate, phenoxyethyl acrylate, isodecyl acrylate, hexyl acrylate, cyclohexyl acrylate, 2-ethylhexyl acrylate, octyl acrylate, nonyl acrylate, stearyl acrylate, 2-phenoxy acrylate, 2-methoxyethyl acrylate, lactone modified esters of acrylic and methacrylic acid, methyl methacrylate, butyl acrylate, isobutyl acrylate, methacrylamide, allyl acrylate, tetrahydrofuryl acrylate, n-hexyl methacrylate, 2-(2-ethoxyethoxy)ethyl acrylate, n-lauryl acrylate, 2-phenoxyethyl acrylate, glycidyl methacrylate, glycidyl acrylate, acrylated methylolmelamine, 2-(N,N-diethylamino)-ethyl acrylate, neopentyl glycol diacrylate, alkoxylated neopentyl glycol diacrylate, ethylene glycol diacrylate, hexylene diacrylate, diethylene diacrylate, dipropylene glycol diacrylate, tripropylene glycol diacrylate, tetraethylene glycol diacrylate, pentaerythritol di-, tri-, tetra-, or penta-acrylate, trimethylolpropane triacrylate, alkoxylated trimethylol-propane triacrylate containing, for example, about 2 to about 14 ethylene or propylene oxide units, Methylene glycol diacrylate, tetraethylene glycol diacrylate, alkoxylated neopentyl glycol diacrylate containing, for example, about 2 to about 14 ethoxy or propoxy units, polyethylene glycol diacrylate, 1,3-butylene glycol diacrylate, 1,4-butanediol diacrylate, 1,6-hexanediol diacrylate, polyethylene diacrylate, corresponding methacrylates or acrylates of the acrylates and methacrylates listed above, and mixtures of any of the above.

Representative cationically polymerizable compositions include epoxides and vinyl ethers. Exemplary epoxides include monomeric, oligomeric or polymeric organic compounds having oxirane ring polymerizable by ring opening, e.g., aliphatic, cycloaliphatic or aromatic materials having, on average, at least one polymerizable epoxy group per molecule and preferably two or more epoxy groups per molecule, and number average molecular weights from 58 to about 100,000 or more. For example, the epoxides may include materials having terminal epoxy groups (e.g., diglycidyl ethers of polyoxyalkylene glycols) and materials having skeletal oxirane units (e.g., polybutadiene polyepoxides). Representative epoxides include those containing cyclohexene oxide groups such as the epoxycyclohexanecarboxylates typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4-epoxy-6-methylcyclohexylmethyl)adipate. For a more detailed list of useful cyclohexane oxide epoxides, reference is made to U.S. Pat. No. 3,117,099. Further representative epoxides include glycidyl ether monomers such as the glycidyl ethers of polyhydric phenols obtained by reacting a polyhydric phenol with an excess of chlorohydrin such as epichlorohydrin (e.g., the diglycidyl ether of 2,2-bis-(2,3-epoxypropoxyphenol)propane). For a more detailed list of useful glycidyl ether epoxides, reference is made to U.S. Pat. No. 3,018,262 and to Lee and Neville, Handbook of Epoxy Resins, McGraw-Hill, New York (1982). Other representative epoxides include octadecylene oxide, epichlorohydrin, styrene oxide, vinyl cyclohexene oxide, vinylcyclohexene dioxide, glycidol, diglycidyl ethers of Bisphenol A (e.g., those available under the trade designations EPON from Resolution Performance Products), epoxy vinyl ester resins (e.g., those available under the trade designations DERAKANE from Dow Chemical Co.), bis(2,3-epoxycyclopentyl) ethers, aliphatic epoxies modified with polypropylene glycol, dipentene dioxides, epoxidized polybutadienes, silicone resins containing epoxy functionality, epoxy silanes (e.g., beta-(3,4-epoxycyclohexyl)ethyltrimethoxy silane and gamma-glycidoxypropyltrimethoxy silane, flame retardant epoxy resins, 1,4-butanediol diglycidyl ethers, polyglycidyl ethers of phenolformaldehyde novolaks, and resorcinol diglycidyl ethers. Other representative cationically-polymerizable materials and cationically/free radically polymerizable materials include those listed in U.S. Patent Application Publication No. US 2006/0029825 A1, the disclosure of which is incorporated herein by reference. Preferred tow viscosity oligomers include polyethers, polyesters, alkoxylated polyepoxy acrylates, aliphatic polyepoxy acrylates, or urethane acrylates and mixtures thereof.

Additional exemplary coating compositions include those described in U.S. Pat. Nos. 4,555,545 and 6,887,937 B1, the disclosures of which are incorporated herein by reference.

The disclosed 100% solids barrier coating compositions optionally may contain a photoinitiator to facilitate curing. Radiation curable compositions that do not contain photoinitiators may be cured using electron beam radiation. Exemplary photoinitiators for free-radically curable compositions include benzophenone, benzoin, acetophenone, benzoin methyl ether, Michler's ketone, benzoin butyl ether, xanthone, thioxanthone, propiophenone, fluorenone, carbozole, diethyoxyacetophenone, 1-hydroxy-cyclohexyl phenyl ketone, the 2-, 3- and 4-methylacetophenones and methoxyacetophenones, the 2- and 3-chloroxanthones and chlorothioxanthones, 2-acetyl-4-methylphenyl acetate, 2,2'-dimethyoxy-2-phenylacetophenone, benzaldehyde, fluorene, anthraquinone, triphenylamine, 3- and 4-allyl-phenone, p-diacetylbenzene, 3-chloro-2-nonylxanthone, 2-chlorobenzophenone, 4-methoxybenzophenone, 2,2',4,4'-tetrachlorobenzophenone, 2-chloro-4'-methylbenzophenone, 4-chloro-4'-methylbenzophenone, 3-methylbenzophenone, 4-tert-butyl-benzophenone, isobutyl ether, benzoic acetate, benzil, benzilic acid, amino benzoate, methylene blue, 2,2-diethoxyacetophenone, 9,10-phenanthrenequinone, 2-methyl anthraquinone, 2-ethyl anthraquinone, 1-tert-butyl-anthraquinone, 1,4-naphthoquinone, isopropylthioxanthone, 2-chlorothioxanthone, 2-iso-propylthioxanthone, 2methylthioxanthone, 2-decylthioxanthone, 2-dodecyl-thioxanthone, 2-methyl-1-[4-(methyl thio)phenyl)]-2-morpholinopropanone-1, combinations thereof and the like. Exemplary photoinitiators for cationically polymerizable compositions include arylsulfonium salts such as those described in U.S. Pat. No. 4,161,478 (Crivello et al.) and U.S. Pat. No. 4,173,476 (Smith et al.), and ferrocenium salts such as IRGACURE 261, commercially available from Ciba Specialty Chemicals, Exemplary photoinitiators for radiation, e.g., UV, curing polymerizable of pigmented compositions include IRGACURE 819, IRGACURE 907, IRGACURE 369, IRGACURE 1800, IRGACURE 1850, or TPO (diphenyl(2,4,6-trimethylbenzoyl)-phosphine oxide), and the like.

The photoinitiator or combination of photoinitiators typically will be present in amounts from about 0.5 to about 15%, about 1 to about 9%, or about 1 to about 5% by weight of the coating composition.

A variety of silica-containing semithixotropic particulates may be used in the disclosed method. The silica-containing semithixotropic particulate has an average particle size of about 1 to about 20 micrometers, and may, for example, have an average particle size of about 1 to about 10 or about 1 to about 5 micrometers. The silica-containing semithixotropic particulate imparts mild thixotropy to the coating composition without rendering the composition unsprayable in conventional commercial spray coating equipment. Preferred silica-containing semithixotropic particulates include precipitated silicas and sodium aluminum silicates, such as the PERKASIL SM series and ELFADENT series of precipitated silicas and SYLOWHITE SM 405 and DURAFILL 200 sodium aluminum silicates from W. R. Grace, the PERFORM-O-SIL series of precipitated silicas from Nottingham Co., the series of precipitated silicas from PPG Industries, Inc., RHODOLINE 34M and TIXOSIL 34K precipitated silicas and RHODOXANE 34 and TIXOLEX 24 AB sodium aluminum silicates from Rhodia Silica Systems. The amount of silica-containing semithixotropic particulate may, for example, be about 0.5 to about 5% of the coating composition weight. At amounts less than about 0.5% there may be no appreciable improvement in holdout, and at amounts above about 3.5% the holdout improvement may level off Wax-coated silicas (such as may be used to impart an anti-matting characteristic to the coating composition) and ground silicas (such as may be used to impart abrasion resistance to the coating composition) typically will not impart thixotropy to the coating composition and, thus, if present, would not be counted as part of the silica-containing semithixotropic particulate amount. Fumed silicas and colloidal silicas usually have too small an average particle size and impart so much thixotropy to the composition at even small addition levels so as to render the composition unsprayable, and accordingly they preferably are not included in the disclosed compositions or, if employed, are present in only minor amounts.

The disclosed 100% solids barrier coating compositions may include a variety of adjuvants including mineral fillers, dispersants, dyes, extenders, surfactants, defoamers, flow control agents, fire-retarders, water-repellancy additives, mold inhibitors, UV-resistant compounds, pH adjusters, rheology modifiers, pigments, waxes, solvents (preferably solvents that do not represent hazardous air pollutants), adhesion promoters, slip agents, release agents, optical brighteners, light stabilizers and antioxidants. The additives are typically present in the barrier coating compositions at 0.01 wt % to about 3 wt %, or about 0.1 wt % to 1 wt %, or about 0.1 wt % to 0.5 wt % and should not be present at a level that will adversely impact the hydrophobicity or adhesion of the coating layers. The types and amounts of such adjuvants will be apparent to those skilled in the art. Those skilled in the art will also appreciate that due to normal differences in application equipment, application conditions, substrates and quality requirements at different end user sites, adjustments will usually be made in the types and amounts of such adjuvants to tailor a coating composition to a particular end user.

Pigments that can be used in the 100% solids barrier coating compositions, include, but are not limited to, titanium dioxide white, carbon black, lampblack, black iron oxide, red iron oxide, transparent red oxide, yellow iron oxide, transparent yellow oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, or organic yellows (such as monoazo yellow) and mixtures thereof.

In another embodiment, the barrier coating composition from which the layers 440, 442 are derived includes a water repellency or hydrophobing agent to increase the resistance of the coating to liquid water intrusion as measured by the Cobb ring test method. In this embodiment, the hydrophobing agent can be present in the barrier coating composition at about 0.01 wt % to about 9 wt %, or about 0.25 wt % to about 2 wt %, or about 0.25 wt % to about 0.5 wt %, based on the total weight of the composition. Suitable hydrophobing agents include, but are not limited to, siloxane additives under the trade designation Tego from Evonik, such as Tegophobe 1401 (amino functional polysiloxane) and Tegophobe 1650 (modified polysiloxane resin). Other suitable hydrophobing agents include but are not limited to natural and paraffin waxes such as Aquabead 325E (paraffin wax emulsion) and Aquabead 525E (natural and paraffin wax) available from Micro Powders, Inc and wax emulsions available from Engineered Polymer Solutions, Minneapolis, Minn., under the trade designations QPM100.

In another embodiment, the barrier coating composition giving rise to the layers 440, 442 includes one or more rheological modifiers. The combination of the rheological modifiers and quick wetting surfactants provides a degree of control over the migration of the coating into the paper. In one embodiment the wetting aid is removed from the formulation and replaced with a thixotropic additive to inhibit the penetration of the barrier coating into the paper and increase the coating permeability. Suitable rheological additives include, but are not limited to, associative thickeners such as Rheolate 1 (alkali-swellable acrylic) from Elementis Specialites, Acrysol RM825 (hydrophobically modified polyethylene oxide urethane) from Dow and suspension aids such as Attagel 50 (Attapulgite) from BASF. The rheological additive is present in the barrier coating at about 0.01 wt % to about 15 wt %, or about 1 wt % to about 10 wt %, or about 2.5 wt % to about 5 wt %.

In another embodiment, the gypsum board 400 can optionally include a top coating 450 on the outwardly facing surfaces of the paper sheets 408, 410 and overlying the coatings 440, 442. The top coating 450 can be applied after the wallboard is removed from the kiln as a barrier to enhance resistance to environmental degradation from, for example, staining, moisture, air and/or UV radiation. In another embodiment, the top coating 450 can also be applied to the paper sheets 408, 410 prior to application of the paper sheets 408, 410 to the gypsum core 401 in the gypsum board manufacturing process. The top coating 450 can be applied in any commercially useful manner, including, but not limited to, direct roll coating, airless spraying, curtain coating, and the like.

The invention will now be illustrated with reference to the following non-limiting examples.

EXAMPLES

Several suitable commercially available resins are described in the embodiments of this invention and elsewhere in this specification. In addition, several other suitable resins are described in Table 1A below.

TABLE 1A

| Name | Composition | NVM (%) | Particle Size (nm) | Acid Value | Theoretical $T_g$ (° C.) |
|---|---|---|---|---|---|
| Emulsion 1 | Acrylic | 48-52% | 120-170 nm | ~13 | 4° C. |
| Emulsion 2 | SCL-Styrenated Acrylic | 37-41% | 40-60 nm | ~20 | 28° C. |
| Emulsion 3 | Pressure Sensitive Acrylic | 58-62% | 500-600 nm | ~8 | −58° C. |

TABLE 1B

| Name | Composition | NVM (%) | Melt Point (° C.) | pH |
|---|---|---|---|---|
| Wax Emulsion | Emulsified Slack Wax | 56-60% | 35.8-39.8° C. | 8.5-9.5 |

Example 1

The adhesive binder composition in Table 1C was prepared controlling the resin level to +/−2 wt %, defoamer level to +/−0.05 wt %, biocide level to +/−0.05 wt %, and surfactant level to +/−0.05%. The adhesive binder was blended with water and finely ground gypsum particles (stucco) to produce a slurry with overall compositions shown in Table 1D. The slurry was applied between paper layers and dried/calcined in a silicone mold to produce a half inch thick gypsum board. For the calcining process the produced gypsum board was held at ambient temperature for 20 minutes then placed in an 82.2° C. oven for 45 minutes (min). Next the board was moved to an oven at 43.3° C. for a minimum of 12 hours to further reduce the excess moisture and finally returned to ambient conditions to reacclimatize during the subsequent days or weeks post production. The humid bond strength of the paper-gypsum interface was measured by conditioning a sample at 41° C. and 90% relative humidity (RH) for 60 minutes. Laboratory control samples were prepared using the same procedure with 2% starch on stucco solids.

TABLE 1C

| Ingredient | Chemical | Wt % |
|---|---|---|
| Resin | Emulsion 1 | 96.5% |
| | Defoamer | 0.1% |
| | Biocide | 0.3% |
| Surfactant | Triton X-405 | 1.7% |
| Surfactant | Tergitol NP-10 | 1.4% |
| Total | | 100% |

TABLE 1D

| | Composition | | | |
|---|---|---|---|---|
| | Lab Control | Sample 1D-1 | Sample 1D-2 | Sample 1D-3 |
| Stucco (g) | 450 | 450 | 450 | 450 |
| Water (g) | 342 | 342 | 299 | 273 |
| Components Table 1C (g) | 0 | 0 | 88.2 | 141.2 |
| Emulsion 1 - Neat Resin (g) | 0 | 90 | 0 | 0 |
| Starch (g) | 9 | 0 | 0 | 0 |
| Humid Bond Strength lb-ft (N-m) | 2.17 ± 1.27 (2.94 ± 1.72) | 2.32 ± 1.64 (3.15 ± 2.22) | 7.35 ± 1.07 (9.97 ± 1.45) | 9.7 ± 1.31 (13.15 ± 1.78) |

Figure 6:
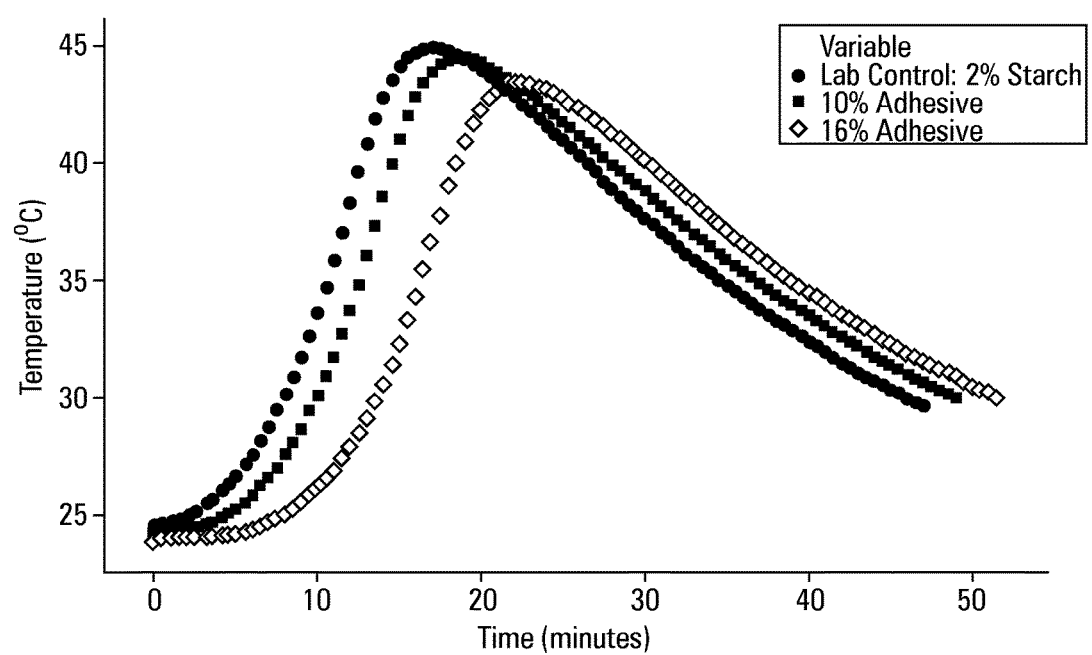
FIG. 6 is a plot of an exothermic reaction curve for the composition of Example 1.

The exotherm generated by the crystallization process was measured by stirring wet and dry ingredients from Table 1E at 100 rpm for 3 minutes. The slurry was poured into a cup with a fixed thermocouple and the temperature recorded. As shown in FIG. 6, the addition of adhesive to the slurry moved the exothermic reaction curve for the gypsum layer to the right compared to a conventional lab control without the additive package.

TABLE 1E

| | Lab Control | 10% Adhesive | 16% Adhesive |
|---|---|---|---|
| Stucco (g) | 75 | 75 | 75 |
| Water (g) | 57 | 49.5 | 45 |
| Components Table 1C (g) | 0 | 15 | 24 |
| Starch (g) | 1.5 | 0 | 0 |

Example 2

The procedure and compositional ranges of Example 1 were repeated using the components in Table 2A and the material amounts in Table 2B.

TABLE 2A

| Ingredient | Chemical | Wt % |
|---|---|---|
| Resin | Rovace 9100 | 96.5% |
| | Defoamer | 0.1% |
| | Biocide | 0.3% |
| Surfactant | Triton X-405 | 1.7% |
| Surfactant | Tergitol NP-10 | 1.4% |
| Total | | 100% |

TABLE 2B

| | Composition | | | |
|---|---|---|---|---|
| | Lab Control | Sample 2B-1 | Sample 2B-2 | Sample 2B-3 |
| Stucco (g) | 450 | 450 | 450 | 450 |
| Water (g) | 342 | 342 | 306.6 | 285.4 |
| Components Table 2A (g) | 0 | 0 | 80.4 | 128.6 |
| Neat Rovace 9100 (g) | 0 | 81.82 | 0 | 0 |
| Starch (g) | 9 | 0 | 0 | 0 |
| Humid Bond Strength lb-ft (N-m) | 2.17 ± 1.27 (2.94 ± 1.72) | 4.89 ± 0.43 (6.63 ± 0.58) | 5.73 ± 0.5 (7.77 ± 0.68) | 6.42 ± 1.28 (8.7 ± 1.74) |

Figure 7:
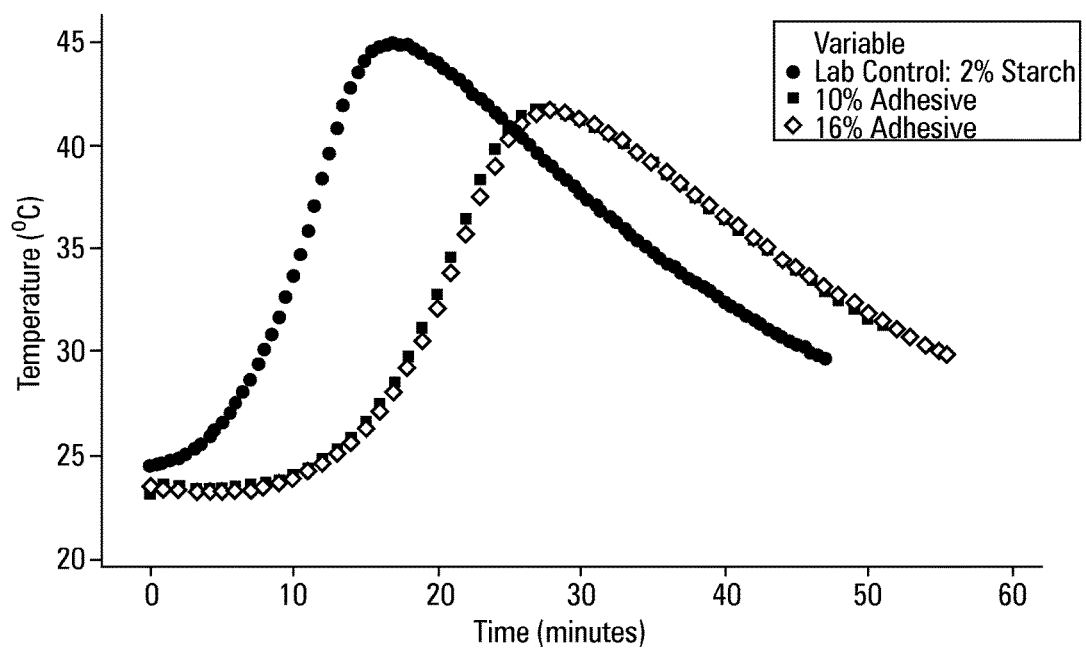
FIG. 7 is a plot of an exothermic reaction curve for the composition of Example 2.

The exotherm generated by the crystallization process was measured by stirring wet and dry ingredients from Table 2C at 100 rpm for 3 minutes. The slurry was then poured into a cup with a fixed thermocouple and the temperature recorded. As shown in FIG. 7, the addition of adhesive to the slurry moved the exothermic reaction curve for the gypsum layer to the right compared to a conventional lab control without the additive package.

TABLE 2C

|  | Lab Control | 10% Adhesive Binder | 16% Adhesive Binder |
|---|---|---|---|
| Stucco (g) | 75 | 75 | 75 |
| Water (g) | 57 | 50.9 | 47.2 |
| Components Table 2A (g) | 0 | 13.6 | 21.8 |
| Starch (g) | 1.5 | 0 | 0 |

Example 3

The procedure and compositional ranges of Example 1 were repeated using the components in Table 2A and the material amounts in Table 3. Compositions were prepared with adhesive binder solids at 2%, 7%, 10%, and 16% of stucco weight and used at the application rates detailed in Table 3.

TABLE 3

| | Composition | | | | | |
|---|---|---|---|---|---|---|
| Ingredients | Control | Sample Neat | Sample 3B-1 | Sample 3B-2 | Sample 3B-3 | Sample 3B-4 |
| Stucco (g) | 450 | 450 | 450 | 450 | 450 | 450 |
| Water (g) | 342 | 342 | 342 | 342 | 342 | 342 |
| Components Table 2A (g) | 0 | 0 | 27.6 | 64.5 | 92.1 | 147.4 |
| Neat Resin | 0 | 81.8 | 0 | 0 | 0 | 0 |
| Starch (g) | 9 | 0 | 0 | 0 | 0 | 0 |
| Humid Bond Strength lb-ft (N-m) | 3.78 ± 1.93 (5.12 ± 2.62) | 3.22 ± 0.67 (4.37 ± 0.91) | 1.54 ± 0.71 (2.09 ± 0.96) | 3.58 ± 0.76 (4.85 ± 1.03) | 6.65 ± 0.48 (9.02 ± 0.65) | 9.47 ± 1.62 (12.84 ± 2.2) |
| Composition from Table 2A or Resin(*) (% of Stucco) | NA | 9%(*) | 2% | 7% | 10% | 16% |
| Application Rate of Slate and Adhesive Composition (g/m$^2$) | NA | 1.65 | 1.54 | 1.62 | 1.67 | 1.76 |
| Binder available to the Slate/Paper interface (g/m$^2$) | NA | 0.0850 | 0.0163 | 0.0571 | 0.0818 | 0.1307 |

Example 4

The procedure and compositional ranges of Example 1 were repeated using the components in Table 4.

TABLE 4

| Ingredients | Sample 4A-1 | Sample 4A-2 | Sample 4A-3 | Sample 4A-4 | Sample 4A-5 | Sample 4A-6 |
|---|---|---|---|---|---|---|
| Stucco (g) | 450 | 450 | 450 | 450 | 450 | 450 |
| Water (g) | 342 | 342 | 342 | 342 | 342 | 342 |
| Emulsion 1 (g) | 90 | 90 | 90 | 0 | 0 | 0 |
| Rovace 9100 (g) | 0 | 0 | 0 | 81.82 | 81.82 | 81.82 |
| Triton X-405 (g) | 0 | 1.61 | 1.61 | 0 | 1.61 | 1.61 |
| Tergitol NP-10 (g) | 0 | 0 | 1.13 | 0 | 0 | 1.13 |
| Humid Bond Strength lb-ft (N-m) | 2.32 ± 1.64 (3.15 ± 2.22) | 5.21 ± 1.61 (7.06 ± 2.18) | 3.66 ± 1.53 (4.96 ± 2.07) | 3.22 ± 0.67 (4.37 ± 0.91) | 5.33 ± 0.96 (7.23 ± 1.3) | 4.7 ± 1.04 (6.37 ± 1.41) |

Example 5

The procedure and compositional ranges of Example 1 were repeated using the components in Table 5. The adhesive binder components in Table 5 were blended with water and finely ground gypsum particles (stucco) to produce a slurry with approximately 16% adhesive solids to stucco solids. The slurry was applied between paper layers and dried/calcined in a silicone mold to produce a half inch thick gypsum board. For the calcining process the produced gypsum board was held at ambient temperature for 20 minutes then placed in a 82.2° C. oven for 45 minutes. Next the board was moved to an oven at 43.3° C. for a minimum of 12 hours to further reduce the excess moisture and finally returned to ambient conditions to reacclimatize during the subsequent days or weeks post production. The humid bond strength of the paper-gypsum interface was measured by conditioning a sample at 41.1° C. and 90% RH for 60 minutes.

TABLE 5

| Ingredient | Chemical | Sample 5A-1 Wt % | Sample 5A-2 Wt % | Sample 5A-3 Wt % | Sample 5A-4 Wt % |
|---|---|---|---|---|---|
| Resin | Rovace 9100 | 96.79% | 96.79% | 96.31% | 95.60% |
| | Defoamer | 0.09% | 0.09% | 0.09% | 0.09% |
| | Biocide | 1.36% | 1.36% | 1.35% | 1.34% |
| Surfactant | Triton X-405 | 1.76% | 0.00% | 1.75% | 1.74% |
| Surfactant | Pluronic 25R2 | 0.00% | 1.76% | 0.50% | 1.24% |
| Adhesive Subtotal | | 100.0% | 100.0% | 100.0% | 100.0% |
| Humid Bond Strength lb-ft (N-m) | | 7.63 ± 0.39 (10.34 ± 0.53) | 7.87 ± 2.27 (10.67 ± 3.08) | 8.4 ± 1.06 (11.39 ± 1.44) | 9.21 ± 1.4 (12.49 ± 1.9) |

As shown in Table 5, the combination of a second (low HLB value) surfactant to the adhesive system increased the humid bond strength of the paper-gypsum interface to values higher than either of the surfactants working independently.

Example 6

The sealer coating composition in Table 6A was produced controlling the resin level to +/−2 wt %, and surfactant level to +/−0.05%. The components in Table 6A were applied via airless spray to greyback paper and cured via gas fired IR for 20 sec to achieve a board surface temperature (BST) of 85° C. The tensile strength of the paper was measured by pulling a 1.27 cm×7.62 cm sample in a tensile testing machine (Testing Machine 500, Ametek Inc.).

TABLE 6A

| Ingredient | Chemical | Sample 6A-1 Wt % | Sample 6A-2 Wt % |
|---|---|---|---|
| Resin | Emulsion 2 | 50.00% | 49.75% |
| | Water | 49.50% | 49.25% |
| Surfactant | Surfynol PSA336 | 0.50% | 1.00% |
| Total | | 100% | 100% |

TABLE 6B

| Sealer Coating Application | Tensile Strength lb-f/in (N/m) | |
|---|---|---|
| | Machine Direction | Cross Direction |
| Neat Paper | 55.72 ± 4.83 (9758.07 ± 845.86) | 21.2 ± 0.35 (3712.69 ± 61.29) |
| Sample 6A-1 | 70.22 ± 5.49 (12297.41 ± 961.45) | 24.62 ± 2.69 (4311.62 ± 471.09) |
| Sample 6A-2 | 81.62 ± 5.94 (14293.85 ± 1040.25) | 29.32 ± 1.58 (5134.72 ± 276.7) |

As shown in Table 6B, the addition of the sealer improved tensile strength of the paper in both the machine and cross direction.

A barrier coating was prepared utilizing the components in Table 6C while controlling the resin level to +/−2 wt %, dispersant to +/−0.05 wt %, defoamer level to +/−0.05 wt %, base level to +/−0.05 wt %, thickener level to +/−0.05 wt %, hydrophobe level to +/−0.05 wt %, biocide level to +/−0.05 wt %, and surfactant level to +/−0.05%.

TABLE 6C

| Ingredient | Chemical | Wt % |
|---|---|---|
| | Water | 40.12% |
| | Dispersant | 2.17% |
| | Defoamer | 0.25% |
| Surfactant | Surfynol 104-A | 0.63% |
| | Base | 0.17% |
| Pigment | Vansil | 32.83% |
| | Thickener | 0.89% |
| Resin | Joncryl 1919 | 19.99% |
| Hydrophobe | Aquabead 525E | 2.98% |
| Total | | 100.0% |

The components in Table 6C were applied via airless spray to the greyback paper samples described in Table 6B and cured via gas fired IR oven for 40 sec to achieve a board surface temperature (BST) of 185° C.

TABLE 6D

| Sealer Coating Application | Barrier Coating Application | Tensile Strength lb-f/in (N/m) | |
|---|---|---|---|
| | | Machine Direction | Cross Direction |
| Neat Paper | Table 7C | 57.03 ± 4.11 (9987.48 ± 719.77) | 21.57 ± 2.21 (3777.49 ± 387.03) |
| Sample 6A-1 | Table 7C | 84.33 ± 6.53 (14768.45 ± 1143.58) | 32.4 ± 4.77 (5674.11 ± 835.36) |

TABLE 6D-continued

| Sealer Coating Application | Barrier Coating Application | Tensile Strength lb-f/in (N/m) | |
|---|---|---|---|
| | | Machine Direction | Cross Direction |
| Sample 6A-2 | Table 7C | 91.73 ± 6.11 (16064.38 ± 1070.02) | 37.1 ± 3.76 (6497.21 ± 658.48) |

The addition of the barrier coating onto the sealer coated paper increased the tensile strength of the paper in both the machine and cross direction with higher strength than the sealer coating or barrier coating operating independently.

Example 7

The components in Table 7A were drawn down on grey back paper with a wire wrapped rod and cured at an oven temperature of 82.2° C. for 5 minutes. The coated paper was used in the manufacture of a gypsum board utilizing the previous compositions detailed in Table 2A in the core of the board at 9% weight adhesive to stucco solids. The water vapor transmission and Cobb values are shown in Table 7B as Sample 7B-1.

TABLE 7A

| Ingredient | Chemical | Wt % |
|---|---|---|
| Resin | Joncryl 1919 | 40.67% |
| | Water | 58.83% |
| Surfactant | Surfynol PSA 336 | 0.50% |
| | Total | 100.0% |

TABLE 7B

| Sample | Sealer Coating Application | Barrier Coating Application | Humid Bond Strength lb-ft (N-m) | Water Vapor Transmission grains/ft$^2$/hr (kg/m$^2$/hr) | Cobb Value (g/100 cm$^2$) |
|---|---|---|---|---|---|
| 7B-1 | Table 7A | None | 4.84 ± 1.33 (6.56 ± 1.8) | 5.05 ± 0.28 (3.52 ± 0.2) | 19.98 ± 41.67 |
| 7B-2 | Table 7A | Table 7C | 5.24 ± 1.26 (7.1 ± 1.71) | 4.69 ± 0.34 (3.27 ± 0.24) | 0.88 ± 0.18 |

The procedure and compositional ranges of Example 6 were repeated using the components in Table 7C. The components in Table 7C were applied via air assisted airless spray to boards coated with the sealer coating in Table 7A. Each board was sprayed with 1 mil dry film thickness (DFT) and cured with forced hot air to a board surface temperature of 71.1° C. The water vapor transmission and Cobb values are shown in Table 7B.

The moisture vapor transmission rate (MVTR) was measured using a modified dry cup method, and Cobb ring analysis was carried out over 2 hrs with 50 grams of water in a 5.08 cm diameter ring.

TABLE 7C

| Ingredient | Chemical | Wt % |
|---|---|---|
| | Water | 40.12% |
| | Dispersant | 2.17% |
| | Defoamer | 0.25% |
| Surfactant | Surfynol 104-A | 0.63% |
| | Base | 0.17% |
| Pigment | Vansil | 32.55% |
| | Thickener | 1.14% |
| Resin | Joncryl 1919 | 19.99% |
| Hydrophobe | Aquabead 325E | 2.98% |
| | Total | 100.0% |

The environmental degradation performance of boards including various combinations of adhesive, sealer coating and barrier coating is shown in Table 7D below. The data in Table 7D establish that a combination of adhesive, sealer coating and barrier coating can prevent delamination of the paper from the gypsum core for a period of at least six months, and in some cases over 10 months. In Table 7D, "pass" means that greater than 75% of the surface area of the paper remained fully adhered to the gypsum core. The term "marginal" in Table 7D means that greater than 50%, but less than 75%, of the surface area of the paper remained fully adhered to the gypsum core. The term "fail" in Table 7D means that less than 50% of the surface area of the paper remained fully adhered to the gypsum core.

TABLE 7D

| Adhesive Binder | Sealer Coating/ Application Level | Barrier Coating | Environmental Degradation | | | | | |
|---|---|---|---|---|---|---|---|---|
| | | | 10 weeks | 12 weeks | 15 weeks | 17 weeks | 24 weeks | 42 weeks |
| 2% Starch | None | Table 7C | Pass | Marginal | Fail | Fail | Fail | Fail |
| Table 2A | None | Table 7C | Pass | Marginal | Fail | Fail | Fail | Fail |
| Table 2A | Table 7A/#0 WW Rod | Table 7C | Pass | Pass | Pass | Marginal | Marginal | Fail |
| Table 2A | Table 7A/#4 WW Rod | Table 7C | Pass | Pass | Pass | Marginal | Marginal | Fail |
| Table 2A | Table 7A/#6 WW Rod | Table 7C | Pass | Pass | Marginal | Marginal | Marginal | Fail |
| Table 2A | Table 7A/#8 WW Rod | Table 7C | Pass | Pass | Pass | Pass | Pass | Pass |

Example 8

The procedure and compositional ranges of Example 6 were repeated using the components in Table 8A. A barrier coating was prepared utilizing the components in Table 8A below.

TABLE 8A

| Ingredient | Chemical | Wt % |
|---|---|---|
|  | Water | 41.42% |
|  | Dispersant | 1.53% |
|  | Defoamer | 0.20% |
| Surfactant | Surfynol 104-A | 0.18% |
| Pigment | Veecote | 32.87% |
| Resin | Joncryl 1919 | 20.40% |
| Surfactant | Surfynol PSA336 | 0.50% |
| Hydrophobe | Wax Emulsion | 2.92% |
|  | Total | 100.0% |

The components in Table 8A were drawn down on paper with a wire wrapped rod and cured at an oven temperature of 82.2° C. for 5 minutes. The coated paper was used in the manufacture of a 13 inch square gypsum board utilizing the previous compositions detailed in Table 2A in the core of the board at 9% weight adhesive binder to stucco solids. The water vapor transmission and Cobb values are shown in Table 8B as Sample 8B-1.

TABLE 8B

| Sample | Sealer Coating Application | Barrier Coating Application | Humid Bond Strength lb-ft (N-m) | Water Vapor Transmission grains/ft$^2$/hr (kg/m$^2$/hr) | Cobb Value (g/100 cm$^2$) |
|---|---|---|---|---|---|
| 8B-1 | Table 8A | None | 5.04 ± 1.07 (6.83 ± 1.45) | 5.2 ± 0.64 (3.63 ± 0.45) | 52.27 ± 43.41 |
| 8B-2 | Table 8A | Table 7C | 5.48 ± 1.51 (7.43 ± 2.05) | 4.66 ± 0.44 (3.25 ± 0.31) | 0.78 ± 0.23 |

The components in Table 7C were applied via air assisted airless spray to boards coated with the sealer coating in Table 8A. Each board was sprayed with 1 mil DFT and cured with forced hot air to a board surface temperature of 71.1° C.

Example 9

The procedure and compositional ranges of Example 6 were repeated using the components in Table 9. The components in Tables 9 were applied via airless spray to a gypsum board with grey back facing paper. The coating was cured in a gas fired infrared (IR) oven for 13 sec at 204.4° C. to achieve a board surface temperature of 82.2° C. The moisture vapor transmission rate (MVTR) was measured using a modified dry cup method and Cobb ring analysis was carried out over 2 hrs with 50 grams of water in a 5.08 cm diameter ring.

TABLE 9

| Ingredient | Chemical | Sample 9A-1 Wt % | Sample 9A-2 Wt % | Sample 9A-3 Wt % |
|---|---|---|---|---|
|  | Water | 39.5% | 40.1% | 40.7% |
|  | Dispersant | 1.8% | 2.2% | 2.5% |
|  | Defoamer | 0.2% | 0.3% | 0.3% |

TABLE 9-continued

| Ingredient | Chemical | Sample 9A-1 Wt % | Sample 9A-2 Wt % | Sample 9A-3 Wt % |
|---|---|---|---|---|
| Surfactant | Surfynol 104-A | 0.5% | 0.6% | 0.7% |
| | Base | 0.1% | 0.2% | 0.2% |
| Pigment | Vansil | 27.2% | 32.5% | 37.5% |
| | Thickener | 1.0% | 1.1% | 1.3% |
| Resin | Joncryl 1919 | 25.8% | 20.0% | 14.6% |
| Hydrophobe | Aquabead 325E | 3.8% | 3.0% | 2.2% |
| | Total | 100.0% | 100.0% | 100.0% |
| 1 mil DFT | Water Vapor Transmission grains/ft$^2$/hr (kg/m$^2$/hr) | 8.43 ± 0.53 (5.88 ± 0.37) | 9.99 ± 0.13 (6.97 ± 0.09) | 11.42 ± 0.61 (7.97 ± 0.43) |
| | Cobb Value (g/100 cm$^2$) | 0.66 ± 0.05 | 1.55 ± 0.11 | 2.32 ± 0.18 |
| Neat Paper | Water Vapor Transmission grains/ft$^2$/hr (kg/m$^2$/hr) | 17.73 ± 0.05 (12.37 ± 0.03) | | |
| | Cobb Value (g/100 cm$^2$) | 1.20 ± 0.25 | | |

Clear improvements over the use of Neat paper can be seen for Cobb values and Water Vapor Transmission.

Example 10

The components in Table 10A were applied to a gypsum board with grey back facing paper. The gypsum board was prepared utilizing the adhesive composition in Table 2A in the slate layer of the board at 9% weight adhesive to stucco solids. The barrier coating was applied on a direct roll coater at a rate of approximately 4 g/ft$^2$ and cured with two passes through a 375mJ UV cure lamp. The water vapor transmission and Cobb values are shown in Table 10B.

TABLE 10A

| Ingredient | Chemical | Sample 10A-1 Wt % | Sample 10A-2 Wt % |
|---|---|---|---|
| Polymer | UV Polyester | 15.43% | 15.43% |
| Polymer | Epoxy Resin Solution | 5.62% | 5.62% |
| Reactive Diluent | Trimethylolpropane triacrylate | 12.1% | 12.1% |
| Reactive Diluent | Oda-N | 1% | 1% |
| Reactive Diluent | Tripropylene glycol diacrylate | 4.9% | 4.9% |
| Photoinitiators | | 1.96% | 1.96% |
| Additive | Methyl diethanol amine | 0.55% | 0.55% |
| Additive | BYK-411 | 0.35% | 0.35% |
| Additive | Naugard BHT | 0.2% | 0.2% |
| Additive | Benzophenone | 1.7% | 1.7% |
| Filler | Calcium Carbonate | 56.2% | — |
| Filler | Wollastonite | — | 56.2% |
| | Total | 100% | 100% |

TABLE 10B

| Sample | Adhesive Binder | Barrier Coating | Environmental Degradation 24 Weeks | Environmental Degradation 37 Weeks | Water Vapor Transmission grains/ft$^2$/hr (kg/m$^2$/hr) | Cobb Value (g/100 cm$^2$) |
|---|---|---|---|---|---|---|
| 10B-1 | Table 2A | Sample 10A-1 | Pass | Fail | 4.07 ± 0.44 (2.84 ± 0.31) | 0.66 ± 0.22 |
| 10B-2 | Table 2A | Sample 10A-2 | Pass | Fail | 4.59 ± 0.94 (3.2 ± 0.66) | 0.87 ± 0.32 |

The environmental degradation performance of boards with a UV cured barrier coating is shown in Table 10B. The data in Table 10B establish that a 100% solids barrier coating can prevent delamination of the paper from the gypsum core for a period of at least six months. In Table 10B, "pass" means that greater than 75% of the surface area of the paper remained fully adhered to the gypsum core. The term "fail" in Table 10B means that less than 50% of the surface area of the paper remained fully adhered to the gypsum core.

Embodiment 1 is an adhesive binder composition for adhering a paper sheet to a gypsum article comprising a gypsum layer having at least one paper sheet on a major surface thereof, wherein the adhesive binder composition comprises a polymeric adhesive and at least one surfactant, and wherein the adhesive binder composition resides at a boundary between the gypsum layer and the paper sheet.

Embodiment 2 is the composition of Embodiment 1, wherein the gypsum layer comprises a low density core layer having a high density slate layer on at least one major surface thereof, and wherein the adhesive binder composition resides in the slate layer.

Embodiment 3 is the composition of any of Embodiments 1 or 2, wherein the adhesive binder composition further resides in the core layer.

Embodiment 4 is the composition of any of Embodiments 1 to 3, wherein the polymeric adhesive comprises at least one of a latex polymer, a water-dispersible polymer, a water-reducible polymer, or an oil-modified polymer.

Embodiment 5 is the composition of any of Embodiments 1 to 4, wherein the polymeric adhesive comprises an aqueous emulsion selected from acrylics, styrene acrylics, vinyl acrylics, styrene acetate acrylics, and combinations thereof.

Embodiment 6 is the composition of any of Embodiments 1 to 5, wherein the polymeric adhesive comprises a polymer or a copolymer with a glass transition temperature of 0 to 30° C.

Embodiment 7 is the composition of any of Embodiments 2 to 6, wherein the slate layer comprises about 4 wt % to about 40 wt % of the adhesive binder composition, based on dry solids.

Embodiment 8 is the composition of any of Embodiments 2 to 7, wherein the slate layer comprises about 0.048 g/m$^2$ to about 0.240 g/m$^2$ of the adhesive binder composition, based on dry solids.

Embodiment 9 is the composition of any of Embodiments 1 to 8, wherein the surfactant is a nonionic surfactant with an HLB value of about 1 to about 20.

Embodiment 10 is the composition of any of Embodiments 2 to 9, wherein the slate layer comprises two or more surfactants.

Embodiment 11 is the composition of any of Embodiments 1 to 10, wherein the surfactant is selected from at least one of: (1) compounds of block copolymers based on ethylene oxide and propylene oxide, and (2) octylphenol or nonylphenol ethoxylates, and combinations thereof.

Embodiment 12 is an adhesive binder composition for adhering a paper sheet to a wallboard article, wherein the wallboard article comprises a gypsum layer with a paper sheet on each major surface thereof, wherein the composition comprises a polymeric adhesive comprising an aqueous emulsion selected from acrylics, styrene acrylics, vinyl acrylics, styrene acetate acrylics, and combinations thereof, and at least one surfactant, and wherein the adhesive binder composition is present in high density slate regions of the gypsum layer adjacent to each of the paper sheets.

Embodiment 13 is the composition of Embodiment 12, wherein the gypsum layer comprises a low density core layer between the slate layers, wherein the core layer comprises about 70 wt % of the gypsum layer, and each of the slate layers comprise about 15 wt % of the gypsum layer.

Embodiment 14 is the composition of any of Embodiments 12-13, wherein the surfactant is a nonionic surfactant with an HLB value of about 1 to about 20.

Embodiment 15 is the composition of any of Embodiments 12 to 14, wherein the composition in at least one of the slate layers comprises two or more different surfactants.

Embodiment 16 is the composition of any of Embodiments 12 to 15, further comprising an adhesive between at least one of the paper sheets and a slate layer adjacent thereto.

Embodiment 17 is the composition of any of Embodiments 12 to 16, wherein the adhesive comprises a first adhesive layer on a paper sheet at an interface with a slate layer adjacent thereto, and wherein the first adhesive layer comprises an aqueous emulsion selected from acrylics, styrene acrylics, vinyl acrylics, styrene acetate acrylics, and combinations thereof, and at least one surfactant.

Embodiment 18 is the composition of any of Embodiments 12 to 17, wherein the adhesive comprises at least one of an acrylic polymer, a styrene acrylic copolymer, a vinyl acetate acrylic copolymer and a vinyl acrylic copolymer.

Embodiment 19 is the composition of any of Embodiments 12 to 18, wherein the adhesive further comprises a pressure sensitive adhesive.

Embodiment 20 is the composition of any of Embodiments claims 12 to 19, wherein the adhesive further comprises a second adhesive layer comprising a pressure sensitive adhesive, and wherein the second adhesive layer is between the first adhesive layer and the slate layer adjacent thereto.

Embodiment 21 is the composition of any of Embodiments 12 to 20, further comprising a barrier coating on an outwardly facing surface of at least one of the paper sheets.

Embodiment 22 is the composition of Embodiment 21, further comprising a top coating on the barrier coating.

Embodiment 23 is a method of applying one or more adhesive compositions to a wallboard article, comprising depositing on a major surface of a first paper sheet a first slurry comprising gypsum, water, and an adhesive binder composition comprising a polymeric adhesive and at least one surfactant.

Embodiment 24 is the method of Embodiment 23, wherein the slurry comprises two more surfactants.

Embodiment 25 is the method of any of Embodiments 23 to 24, further comprising depositing a second slurry on a major surface of a second paper sheet, wherein the second slurry comprises gypsum, water, and an adhesive binder composition comprising a polymeric adhesive and at least one surfactant.

Embodiment 26 is the method of any of Embodiments 23 to 25, further comprising applying a third slurry between the first slurry and the second slurry to form a wallboard precursor construction.

Embodiment 27 is the method of Embodiment 26, further comprising heating the wallboard precursor construction to crystallize the gypsum in the first, second and the third slurries and form a wallboard.

Embodiment 28 is the method of any of Embodiments 23 to 27, further comprising depositing a first adhesive composition on the first sheet of paper prior to applying the first slurry.

Embodiment 29 is the method of any of Embodiments 25 to 28, further comprising depositing a second adhesive composition on the second sheet of paper prior to applying the second slurry.

Embodiment 30 is the method of any of Embodiments 23 to 29, wherein the first paper sheet comprises a major surface comprising a layer of a first adhesive, and wherein the first slurry is deposited on the layer of the first adhesive.

Embodiment 31 is the method of any of Embodiments 25 to 30, wherein the second paper sheet comprises a major surface comprising a layer of a second adhesive, and wherein the second slurry is deposited on the layer of the second adhesive.

Embodiment 32 is the method of any of Embodiments 30 to 31, wherein the first paper sheet further comprises a layer of a pressure-sensitive adhesive on the layer of the first adhesive.

Embodiment 33 is the method of any of Embodiments 31 to 32, wherein the second paper sheet further comprises a layer of a pressure-sensitive adhesive on the layer of the second adhesive.

Embodiment 34 is the method of any of Embodiments 27 to 33, further comprising applying a coating composition to an exposed surface of at least one of the first and the second sheets of paper on the wallboard.

Embodiment 35 is the method of Embodiment 34, further comprising applying a top coating on the coating composition.

Embodiment 36 is a method of applying one or more adhesive compositions to a gypsum wallboard, comprising the steps of:

adding a first adhesive binder composition comprising a polymeric adhesive comprising an aqueous emulsion selected from acrylics, styrene acrylics, vinyl acrylics, styrene acetate acrylics, and combinations thereof, and at least one surfactant, to gypsum particles and water to form a first slate composition;

applying the first slate composition on a major surface of a first paper sheet;

adding a second adhesive binder composition comprising a polymeric adhesive comprising an aqueous emulsion selected from acrylics, styrene acrylics, vinyl acrylics, styrene acetate acrylics, and combinations thereof, and at least one surfactant, to gypsum particles and water to form a second slate composition, wherein the first and second slate compositions can be the same or different;

applying the second slate composition on a major surface of a second paper sheet; and applying between the first slate composition and the second slate composition a core composition comprising gypsum particles and water.

Embodiment 37 is the method of Embodiment 36, wherein the first and the second slate compositions comprise first and second temporary coating regions at a bonding interface with their respective first and second paper sheets, and wherein the temporary coating regions each comprise gypsum particles in a liquid phase with the adhesive binder composition.

Embodiment 38 is the method of Embodiment 37, further comprising thermally treating the first slate composition, the second slate composition and the core composition to remove water from the first and the second temporary coating regions.

Embodiment 39 is a coating composition for an unattached wallboard article, wherein the wallboard comprises a paper sheet on a gypsum layer, wherein the coating composition comprises an aqueous emulsion selected from acrylics, styrene acrylics, vinyl acrylics, styrene acetate acrylics, and combinations thereof, and at least one surfactant, and wherein the coating composition is applied on an exposed major surface of the paper sheet.

Embodiment 40 is the composition of Embodiment 39, further comprising a topcoat composition on the coating composition.

Embodiment 41 is the composition of any of Embodiments 39 to 40, wherein the coating composition comprises two or more surfactants.

Embodiment 42 is the composition of Embodiment 41, wherein the surfactants comprise an HLB value of about 1 to about 20.

Embodiment 43 is the composition of any of Embodiments 39 to 42, wherein the gypsum layer comprises a polymeric adhesive and at least one surfactant.

Embodiment 44 is the composition of Embodiment 43, wherein the polymeric adhesive comprises at least one of a latex polymer, a water-dispersible polymer, a water-reducible polymer, or an oil-modified polymer.

Embodiment 45 is the composition of any of Embodiments 39 to 44, wherein the paper sheet further comprises at least one adhesive layer adjacent the gypsum layer.

Embodiment 46 is a method of making an unattached wallboard article comprising a first paper sheet on a first major surface of a gypsum layer and a second paper sheet on a second major surface of the gypsum layer, the method comprising:

applying to an exposed surface of at least one of the first and the second paper sheets a coating composition comprising an aqueous emulsion selected from acrylics, styrene acrylics, vinyl acrylics, styrene acetate acrylics, and combinations thereof, and at least one surfactant; and drying the coating composition.

Embodiment 47 is the method of Embodiment 46, further comprising applying a top coating composition on the coating composition, wherein the top coating composition is applied either before or after step (b).

Embodiment 48 is the method of any of Embodiments 46 to 47, wherein the coating composition is applied to the paper sheets by spraying, roll coating, curtain coating, or flood coating.

Embodiment 49 is the method of any of Embodiments 46 to 48, wherein at least one of the first and the second paper sheets comprise at least one adhesive layer adjacent to the gypsum layer.

Embodiment 50 is the method of Embodiment 49, wherein the adhesive layer comprises a layer of a pressure sensitive adhesive.

Embodiment 51 is the method of any of Embodiments 46 to 50, wherein the gypsum layer comprises a polymeric adhesive and at least one surfactant.

Embodiment 52 is a method of making a wallboard comprising a first paper sheet, a second paper sheet, and a gypsum layer between the first paper sheet and the second paper sheet, the method comprising:

applying to an exposed surface of at least one of the first and the second paper sheets a coating composition comprising an aqueous emulsion selected from acrylics, styrene acrylics, vinyl acrylics, styrene acetate acrylics, and combinations thereof, and at least one surfactant; and drying the gypsum layer and the coating composition to form a wallboard.

Embodiment 53 is the method of Embodiment 52, further comprising applying a top coating composition on the coating composition, wherein the top coating composition is applied either before or after step (b).

Embodiment 54 is a method of making a wallboard, comprising:

coating a first gypsum layer on a first major surface of a first paper sheet, wherein a second major surface of the first paper sheet comprises a first coating derived from an aqueous emulsion selected from acrylics, styrene acrylics, vinyl acrylics, styrene acetate acrylics, and combinations thereof, and at least one surfactant;

coating a second gypsum layer on a first major surface of a second paper sheet, wherein a second major surface of the second paper sheet comprises a second coating derived from an aqueous emulsion selected from acrylics, styrene acrylics, vinyl acrylics, styrene acetate acrylics, and combinations thereof, and at least one surfactant, and wherein the first coating and the second coating may be the same or different;

depositing a third gypsum layer between the first gypsum layer and the second gypsum layer to form a wallboard precursor construction; and drying the wallboard precursor construction to form a wallboard.

Embodiment 55 is the method of Embodiment 54, wherein the first major surface of the first sheet of paper comprises a first layer of an adhesive, and the slurry is applied on the first layer of adhesive.

Embodiment 56 is the method of any of Embodiments 54 to 55, wherein the first major surface of the second sheet of paper comprises a second layer of an adhesive, and the slurry is applied between the first and the second layers of adhesive.

Embodiment 57 is a method of making a wallboard, comprising:

applying a first coating composition to a first side of a first paper sheet, wherein the first coating composition comprises an aqueous emulsion selected from acrylics, styrene acrylics, vinyl acrylics, styrene acetate acrylics, and combinations thereof, and at least one surfactant;

depositing a first slurry on a second side of the first paper sheet to form a first gypsum slate layer, wherein the first slurry comprises a first adhesive binder composition comprising an aqueous emulsion selected from acrylics, styrene acrylics, vinyl acrylics, styrene acetate acrylics, and combinations thereof, and at least one surfactant; applying a second coating composition to a first side of a second paper sheet, wherein the second coating composition comprises an aqueous emulsion selected from acrylics, styrene acrylics, vinyl acrylics, styrene acetate acrylics, and combinations thereof, and at least one surfactant;

depositing a second slurry on a second side of the second paper sheet to form a second gypsum slate layer, wherein the second slurry comprises gypsum, water and a second adhesive binder composition comprising an aqueous emulsion selected from acrylics, styrene acrylics, vinyl acrylics, styrene acetate acrylics, and combinations thereof, and at least one surfactant;

depositing a gypsum core layer between the first gypsum slate layer and the second gypsum slate layer to form a wallboard precursor construction, wherein the gypsum core layer comprises gypsum, water, and entrained air; and drying the wallboard precursor construction.

Embodiment 58 is the method of Embodiment 57, wherein the first coating composition is dried prior to applying the first slurry to the first paper sheet.

Embodiment 59 is the method of any of Embodiments 57 to 58, wherein the second coating composition is dried prior to applying the second slurry to the second paper sheet.

Embodiment 60 is the method of any of Embodiments 57 to 59, wherein the wallboard precursor construction is sufficiently dried to crystallize the gypsum in the first gypsum slate layer, the gypsum core layer and the second gypsum slate layer.

Embodiment 61 is the method of any of the Embodiments 57 to 60, wherein the first and the second gypsum slate layers each comprise two or more surfactants.

Embodiment 62 is a wallboard article, comprising:
a gypsum layer; and
a paper sheet on each major surface of the article, wherein the paper sheet is adhered to the gypsum layer with an adhesive binder composition comprising a polymeric adhesive and at least one surfactant and has a humid bond strength of at least 3 N-m.

Embodiment 63 is a wallboard article, comprising:
a gypsum layer having a gypsum core layer and at least one high density gypsum slate layer adjacent the core layer; and a paper sheet on each major surface of the article, wherein the paper sheet is adhered to the gypsum with an adhesive binder composition comprising a polymeric adhesive and at least one surfactant and has a humid bond strength of at least 3 N-m.

Embodiment 64 is the article of any of Embodiments 62 to 63, wherein the paper sheet is adhered to the gypsum with a humid bond strength of at least 6 N-m.

Embodiment 65 is the article of any of Embodiments 62 to 63, wherein the paper sheet is adhered to the gypsum with a humid bond strength of at least 9 N-m.

Embodiment 66 is the article of any of Embodiments 62 to 63, wherein the paper sheet is adhered to the gypsum with a humid bond strength of at least 12 N-m.

Embodiment 67 is the article of any of Embodiments 63 to 66, wherein the gypsum layer comprises a low density core layer between two slate layers, wherein the core layer comprises between about 70 and 94 wt % of the gypsum layer, and each of the slate layers comprise between about 6 and 30 wt % of the gypsum layer.

Embodiment 68 is the article of any of Embodiments 62 to 67, wherein the adhesive binder composition is added to the gypsum during the wallboard manufacturing process, or is applied at an interface between the gypsum and the paper facing during the wallboard manufacturing process, or is coated on the paper facing to form an adhesive layer adjacent to the gypsum in the wallboard construction.

Embodiment 69 is the article of any of Embodiments 62 to 68, wherein the article further comprises a barrier coating on an outwardly facing surface of at least one of the paper sheets.

Embodiment 70 is the article of any of Embodiments 62 to 69, wherein the article further comprises a top coating on the barrier coating.

Embodiment 71 is the article of any of Embodiments 62 to 70, wherein the paper has a basis weight of between about 35 pounds per thousand ft$^2$ (1.5 kg/1000 m$^2$) to about 65 pounds per thousand ft$^2$ (2.7 kg/1000 m$^2$).

Embodiment 72 is the article of any of Embodiments 62 to 71, wherein the article has a water vapor permeability between about 8 to about 50 grains/ft$^2$/hour.

Embodiment 73 is the article of any of Embodiments 62 to 72, wherein the article has a Cobb value less than about 3 g/100 cm$^2$ over 2 hours.

Embodiment 74 is the article of any of Embodiments 62 to 73, wherein the article resists degradation by the elements for at least 6 months.

Various embodiments of the invention have been described. These and other embodiments are within the scope of the following claims.

What is claimed is:

1. An adhesive binder composition for adhering a paper sheet to a gypsum article comprising a gypsum layer having at least one paper sheet on a major surface thereof, wherein the gypsum layer comprises a low density core layer having a high density slate layer on at least one major surface thereof adjacent the paper sheet, the adhesive binder composition comprising:

about 90% by weight to about 30% by weight, based on the total weight of non-volatile components in the adhesive binder composition, of a polymeric adhesive, wherein the polymeric adhesive comprises an aqueous emulsion chosen from acrylics, styrene acrylics, vinyl acrylics, styrene acetate acrylics, and combinations thereof, wherein the polymeric adhesive provides an extended liquid phase open time and the open time is controlled so that gypsum particle crystallization is not impeded, and wherein the polymeric adhesive comprises a polymer or a copolymer with a glass transition temperature of 0 to 30° C., and at least one surfactant, and wherein the slate layer comprises about 4% by weight to about 40% by weight of the adhesive binder composition.

2. The composition of claim 1, wherein the adhesive binder composition further resides in the core layer.

3. The composition of claim 1, wherein the surfactant is selected from at least one of: (1) compounds of block copolymers based on ethylene oxide and propylene oxide, and (2) octylphenol or nonylphenol ethoxylates, and combinations thereof.

4. The composition of claim 1, wherein the gypsum article further comprises an adhesive between at least one of the paper sheets and a slate layer adjacent thereto, the adhesive chosen from the adhesive binder composition, a pressure-sensitive sensitive adhesive, and combinations thereof.

5. The composition of claim 1, wherein the gypsum article further comprises a barrier coating on an outwardly facing surface of at least one of the paper sheets, and wherein the barrier coating comprises the adhesive binder composition.

6. The composition of claim 5, further comprising a top coating on the barrier coating.

7. The composition of claim 1, wherein the gypsum layer comprises up to about 2% by weight starch.

8. The composition of claim 1, wherein the gypsum layer comprises 0% by weight starch.

9. A wallboard article, comprising:

a gypsum layer having a gypsum core layer and at least one high density gypsum slate layer adjacent the core layer, wherein the gypsum layer comprises a low density core layer having a high density gypsum slate layer on each major surface thereof; and a paper sheet on each major surface of the high density gypsum slate layer, wherein the paper sheet is adhered to the high density gypsum slate layer, wherein the high density gypsum slate layer comprises about 4% by weight to about 40% by weight of an adhesive binder composition comprising a polymeric adhesive and at least one surfactant and has a humid bond strength with the paper sheet of at least 3 N-m, the adhesive binder composition comprising about 90% by weight to about 30% by weight, based on the total weight of non-volatile components in the adhesive binder composition, of the polymeric adhesive, wherein the polymeric adhesive provides an extended liquid phase open time and the open time is controlled so that gypsum particle crystallization is not impeded, wherein the polymeric adhesive comprises an aqueous emulsion chosen from acrylics, styrene acrylics, vinyl acrylics, styrene acetate acrylics, and combinations thereof, and wherein the polymeric adhesive comprises a polymer or a copolymer with a glass transition temperature of 0 to 30° C.

10. The article of claim 9, wherein the article has a water vapor permeability between about 8 to about 50 grains/ft2/hour.

11. The article of claim 9, wherein the article has a Cobb value less than about 3 g/100 $cm^2$ over 2 hours.

12. A wallboard article, comprising:

a gypsum layer having a gypsum core layer and at least one high density gypsum slate layer adjacent the core layer, wherein the high density gypsum slate layer comprises about 4% by weight to about 40% by weight of an adhesive binder composition, comprising:

about 90% by weight to about 30% by weight, based on the total weight of non-volatile components in the adhesive binder composition, of a polymeric adhesive, the polymeric adhesive comprising an aqueous emulsion chosen from acrylics, styrene acrylics, vinyl acrylics, styrene acetate acrylics, and combinations thereof, wherein the polymeric adhesive provides an extended liquid phase open time and the open time is controlled so that gypsum particle crystallization is not impeded, and wherein the polymeric adhesive comprises a polymer or a copolymer with a glass transition temperature of 0 to 30° C., and at least one surfactant; and a paper sheet on the high density gypsum slate layer, wherein the paper sheet is adhered to the high density gypsum slate layer with a humid bond strength of at least 3 N-m.

13. The wallboard article of claim 12, further comprising an adhesive between the paper sheet and the high density slate layer, the adhesive chosen from the adhesive binder composition, a pressure-sensitive sensitive adhesive, and combinations thereof.

14. The wallboard article of claim 12, further comprising a barrier coating on an outwardly facing surface of the paper sheet opposite the high density gypsum slate layer, wherein the barrier coating comprises the adhesive binder composition.

15. The wallboard article of claim 12, wherein the high density gypsum slate layer comprises 0% starch.

* * * * *